United States Patent [19]

Barnes

[11] Patent Number: 5,252,029
[45] Date of Patent: Oct. 12, 1993

[54] VERTICAL AXIS WIND TURBINE

[76] Inventor: Robert J. Barnes, P.O. Box 341601, Milwaukee, Wis. 53234

[21] Appl. No.: 759,513

[22] Filed: Sep. 13, 1991

[51] Int. Cl.$^5$ .................. F03D 3/00; F03D 11/00
[52] U.S. Cl. .................. 416/142; 416/132 B; 416/227 A; 416/DIG. 6; 416/Dig. 8
[58] Field of Search ...... 416/227 A, DIG. 4, DIG. 6, 416/DIG. 8, 142, 132 B, 41, 44; 290/44, 55; 29/889, 889.1

[56] References Cited

U.S. PATENT DOCUMENTS

| 460,837 | 10/1891 | Addis | 416/142 |
|---|---|---|---|
| 3,918,839 | 11/1975 | Blackwell et al. | 416/227 A |
| 4,364,710 | 12/1982 | Campbell | 416/142 |
| 4,366,387 | 12/1982 | Carter et al. | 416/132 |
| 4,410,806 | 10/1983 | Brulle | 290/55 |
| 4,449,053 | 5/1984 | Kutcher | 416/142 |
| 4,624,624 | 11/1986 | Yum | 416/142 |
| 4,630,996 | 12/1986 | Masaki | 416/142 |
| 4,664,596 | 5/1987 | Wood | 416/169 R |

FOREIGN PATENT DOCUMENTS

| 2644557 | 4/1978 | Fed. Rep. of Germany | 416/41 R |
|---|---|---|---|
| 282178 | 12/1987 | Japan | 416/142 |
| 2206653 | 1/1989 | United Kingdom | 416/DIG. 8 |

OTHER PUBLICATIONS

Thomas G. Carne All 26 pages 1980 "Guy-Cable Design and Damping for Vertical Turbine".
B. F. Blackwell All 8 pages 1974 (Apr.) "The Vertical-Axis Wind Turbine (How It Works)".
Dudd, Ashwill, Berg, All 19 pages 1989 (Sep.) "Test Results and Status of the Doe/Sandia 34-M VAWT".
Robert C. Reuter, Mark Worstell 31 Page all 1878 "Torque Ripple in a Vertical Axis Wind Turbine".
Richard H. Braasch All 37 pages 1978 "The Design, Construction, Testing and Manufacture of VAWT".
Mark-H, Worstell All 32 page, Jan., 1979 "Aerodynamic Performance of the 17 Meter O1A, VAWT".

Primary Examiner—Edward K. Look
Assistant Examiner—James A. Larson

[57] ABSTRACT

A Darrieus-type vertical axis wind turbine is disclosed which includes a vertically extending hollow rotor shaft mounted on a support structure with two, three, or four rotor blades of troposkein configuration on the rotor shaft for rotating the shaft in response to wind energy and thereby drive a generator to produce electrical power. The turbine includes an erection hinge and gin pole which permits the turbine to be cable hoisted using a simple winch mounted at or near ground level. The erection hinge and pole also permits the turbine to be completely assembled near ground level. The turbine includes two sets of guy cables. The upper set holds the upper bearing assembly and the upper rotor shaft portion in a fixed vertical position. The lower cable set holds the lower rotor shaft portion and the support structure also in a fixed vertical position. A flexible coupling is used to connect the low speed shaft of the generator speed reducer to the rotor shaft. This flexible low speed coupling greatly reduces wind induced torque ripple and related vibration and resonance problems. A guy cable tension adjustment and vibration damping apparatus is also disclosed.

4 Claims, 19 Drawing Sheets

VERTICAL AXIS WIND TURBINE

BACKGROUND OF THE INVENTION

1. Field of Art

This invention relates to vertical axis wind turbines.

2. Brief Description of the Prior Art

The Darrieus-type vertical axis wind turbine (VAWT) having its rotating shaft traverse to the air was patented by G. J. M. Darrieus in the United States in 1931 (U.S. Pat. No. 1,835,-018). The Darrieus-type vertical axis wind turbine is said to resemble an eggbeater with curved blades connected at both ends to the ends of a rotating shaft. Each blade of the turbine is a symmetric airfoil in cross section and is curved in the shape that a perfectly flexible cable of uniform density and cross section would assume if spun about a vertical axis. The shape of the blade is represented by the Greek word "troposkein" meaning turning rope. With blades having a troposkein confirguration, major stresses are in tension when the rotor is spinning. Thus, rotation of the turbine will not cause the blades to bend nor produce bending stresses in the blades.

The operational principal of the vertical axis wind turbine (VAWT) is analogous to the aerodynamics of a wing (airfoil) as is described in a report entitled The Vertical Axis Wind Turbine "How It Works", SLA-74-0160, December 1974 by B. F. Blackwell of Sandia Laboratories, Albuquerque, N. Mex. Fluid forces on the airfoil of the VAWT are divided into lift and drag forces. A component of the lift force causes rotor rotation and a component of the drag force opposes rotation. The rotor torque will be positive as long as the driving component of the lift force exceeds the opposing component of the drag force. With such a system the aerodynamic performance is poor at low wind speeds and the blades tend to stall at low rotational speeds. Consequently, some type of auxiliary device such as a motor must usually be employed to start the system.

Interest in Darrieus-type vertical axis wind turbines has been stimulated in recent years by the energy crisis and of the important advantages of such turbines over horizontal machines which include: (1) the turbine accepts wind from all directions and therefore doesn't require costly direction orientating equipment, (2) the turbine doesn't require adjustment of blade pitch to limit maximum output at high wind speeds, (3) the generator, speed reducer and brake do not have to be supported as part of the wind orientating platform, (4) the VAWT blades are supported at both ends and other strategic points as necessary due to excellent aerodynamic performance without pitch change this coupled with the fact that the blades experience significantly less bending stress makes for less expensive and longer lasting blades.

Despite the advancements that have been made in the design of VAWTs and the the inherent advantages of VAWTs over horizontal axis machines, a VAWT is desired which can be even more cost effective in construction, erection, maintenance and operation.

Thereafter, inventors have made several attempts to create a cost effective VAWT that will prosper with the slowly increasing value of energy since the panic of 1973. U.S. Pat. No. 4449053 to Kutcher and the Aluminum Company of America (1984) discloses VAWT machines for a wide range of power capacities (22 KW, 60 KW, 112 KW, 300 KW, 500 KW). These VAWTs had an erection hinge for the rotor and upper bearing assemblies and a costly automatic oiling arrangement for the upper bearing. The Kutcher VAWT had a large fixed central support structure that favored the 112 KW and larger machines. The Kutcher VAWTs did not have an erection gin pole therefore requiring the use of a crane for the erection of all machines regardless of power rating. The Kutcher VAWTs did not address guy cable vibration. The Kutcher VAWT was designed with a bias toward large power ratings, massive fixed central support structures, rotor assemblies, rotor bearings, gearboxes, motor-generators and cranes. Nearly all of the Kutcher VAWT components require costly special tooling and enormous first cost financial commitment at what has proven to be little or no production volume to date. The Kutcher U.S. Pat. No. 4449053 expired for lack of a maintenance fee.

U.S. Pat. Nos. 4664596 and 4659284 to Wood address the guy cable vibration and rotor torque resonance by continuously maintaining upper bearing guy cable tension, regardless of temperature, by raising the rotor tube under the pressure of a hydralic lower bearing. The Wood VAWT disclosure seems to suffer the cost peculiarities of large power capacities to include requiring a crane for assembly and erection and special low production components.

U.S. Pat. No. 4624624 to Yum has a two blade VAWT with four blade sections. Two blade sections are hinge connected in the center of each blade and at both upper and lower rotor hubs. The upper rotor blade hub can slide up and down a splined rotor tube to form a large number of blade sweep areas and blade maximum diameters. The Yum VAWT claims to be self starting although the explanation is unclear. In the Yum VAWT the blade sweep area is smallest, when the upper blade hub is lowest. This small sweep area is claimed to be a safety position in high winds. It is a valid safety feature. Fortunately fixed sweep area VAWTs are easy to shut down in high winds. This high wind shut down is possible because VAWTs stall so easily at low tip speed ratios. The point is to size the generator and speed reducer so that in winds above 25 miles per hour the VAWT tip speed ratio is always below 4. Cost savings in brake or generator down sizing is more than offset by the moving hub costs. In addition the Yum VAWT moving blade hub must have great support to overcome the great centrifugal forces on the blades in any practical size (above 2000 watts for maximum design wind speed) turbine. This is why most VAWT blade hubs are welded to rotor tubes with relatively large structural moments of inertia.

U.S. Pat. No. 4364710 to Campbell discloses a vertical axis windmill with pivoting sail blades. This machine is an excellent example of cable hoisting an entire turbine to a vertical operating position using an erection gin pole and a simple ground mounted winch. Despite this positive feature the Campbell windmill is limited to home use size. This turbine size is due to blade centrifugal forces. Installed high wind survival is also a maintenance problem. Campbell acknowledges these problems in his description (lines 14 through 31).

OBJECTIVES AND ADVANTAGES

The objectives of this invention are:

A. To provide a vertical axis wind turbine design with improved overall cost effectiveness, particularly construction and installation cost.

B. To provide a cost effective vertical axis wind turbine design for turbines of practical commercial and industrial power conversion ratings.

C. This cost effective VAWT must also survive high winds while in a fully installed condition.

D. This cost effective VAWT design must inhibit rotor torque ripple, guy cable vibration and rotor blade fatique for long operating life. The objectives of this invention have been obtained with three principal advantages over previous vertical axis wind turbine designs:

1. An additional set of guy cables to hold the central support structure and lower bearing in a vertical position. This guy cable set reduces the cost of the central support structure. The central support structure principally consists of a large round metal pipe.
2. Pivoting the entire turbine during erection. This invention takes advantage of the support structure guy cables and pivots the support structure and lower bearing along with the rotor and upper bearing assemblies, from a horizontal to a vertical position. The turbine single axis erection pivot pin or pins are mounted close to the ground in a ground embedded central support structure anchor.
3. The use of erection and hold down gin poles combined with the low erection pivot axis, and a smaller thus lighter turbine allows for turbine erection cable hoisting without an expensive crane. The turbines of this invention have been sized (5 Kilowatts, 10 KW, 16 KW, 32 KW at maximum design wind speed) and designed to allow erection cable hoisting with a grounded mounted general purpose winch. Additional design features of this invention are:

1. A flexible rotor shaft to speed reducer general purpose coupling. This coupling has a replaceable rubber block to reduce torque ripple.
2. Rotor blade support beams brace between each blade and the rotor shaft. These rotor blade support beams reduce blade flex and thus fatigue.
3. A simple inexpensive guy cable vibration dampening device installed in each cable. This cable vibration dampening device reduces cable vibration and therefore working cable tension.
4. Conservative sizing of guy cables for withstanding high winds with turbine fully installed.
5. A spring set electrically released emergency stopping and parking brake is used. This brake is sized and engaged to stop the turbine rotor in high winds.
6. The low erection pivot axis allows the use of inexpensive and readily available lift equipment for turbine component assembly. This low pivot axis reduces turbine maintenance costs.
7. The hollow rotor shafts, rotor hubs, rotor blade end connections and rotor blades have been sized and designed to withstand rotor run away speeds in high winds.
8. This VAWT design uses a rotor blade having a close approximation to the NACA 66-0018 symmetrical blade cross sectional profile. This blade profile is also very similar to the SAND-0018/50 blade profile used on the current U.S. Department of Energy, Wind Energy Research Division, Sandia National Laboratories 34 meter VAWT. This natural laminar flow blade profile is cited by DOE/SANDIA as one of the latest innovations in Darrieus techology.
9. The practial size of the turbines of this invention allows for the cost effective adaptation of readily available industrial components with standard pricing such as: tapered roller bearings, inline gearboxs, induction motor generators, and standard steel and aluminum, pipe, plate and structural beams.

Still futher turbine design features and advantages will become apparent from a consideration of the ensuing description and drawings.

DESCRIPTION OF A PREFERRED EMBODIMENT

Figure 1:
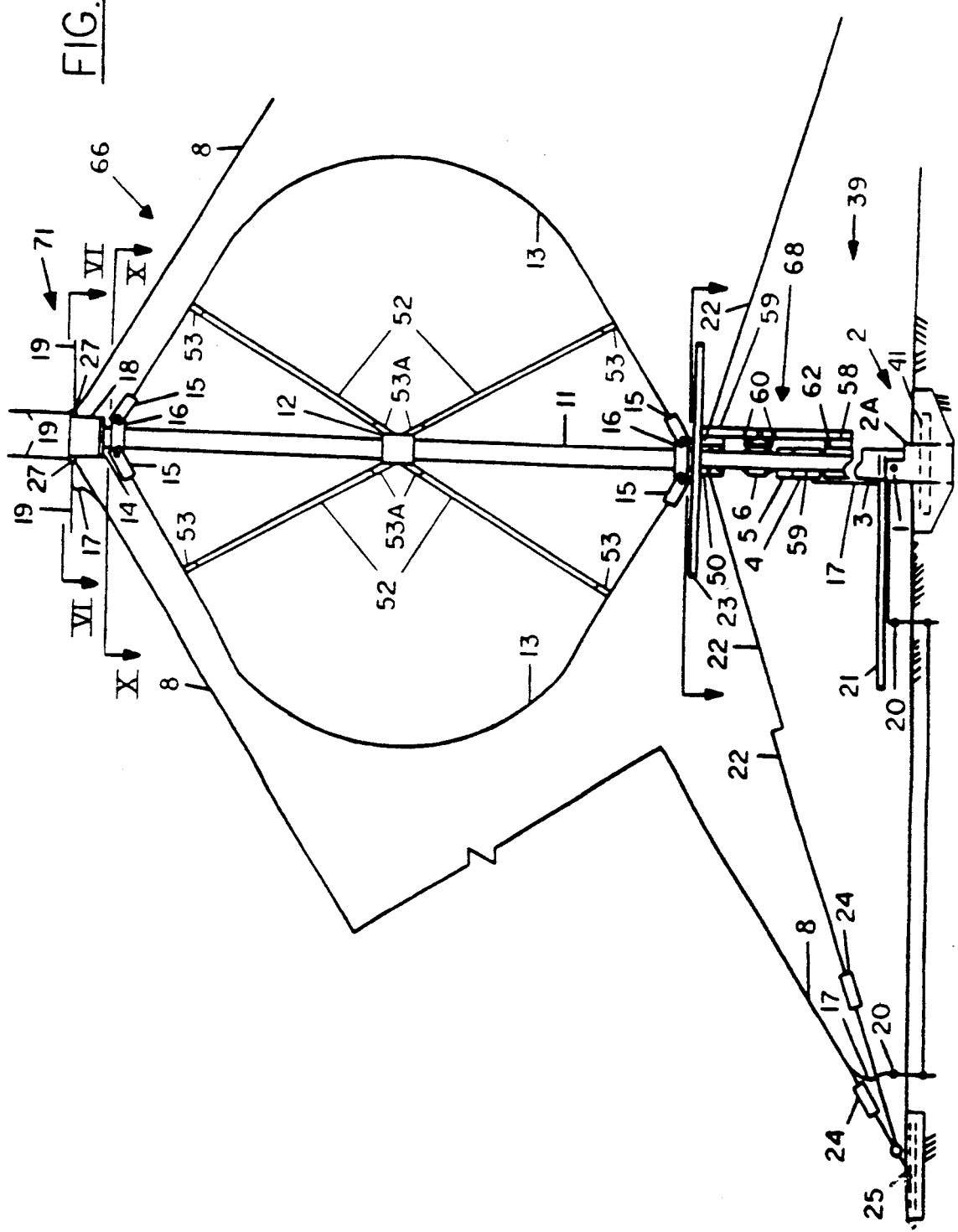
FIG. 1 A side elevation view of the 5 KW two blade vertical axis wind turbine of this invention fully erected. A portion of the central support structure has been cut away to show greater detail.
Figure 2:
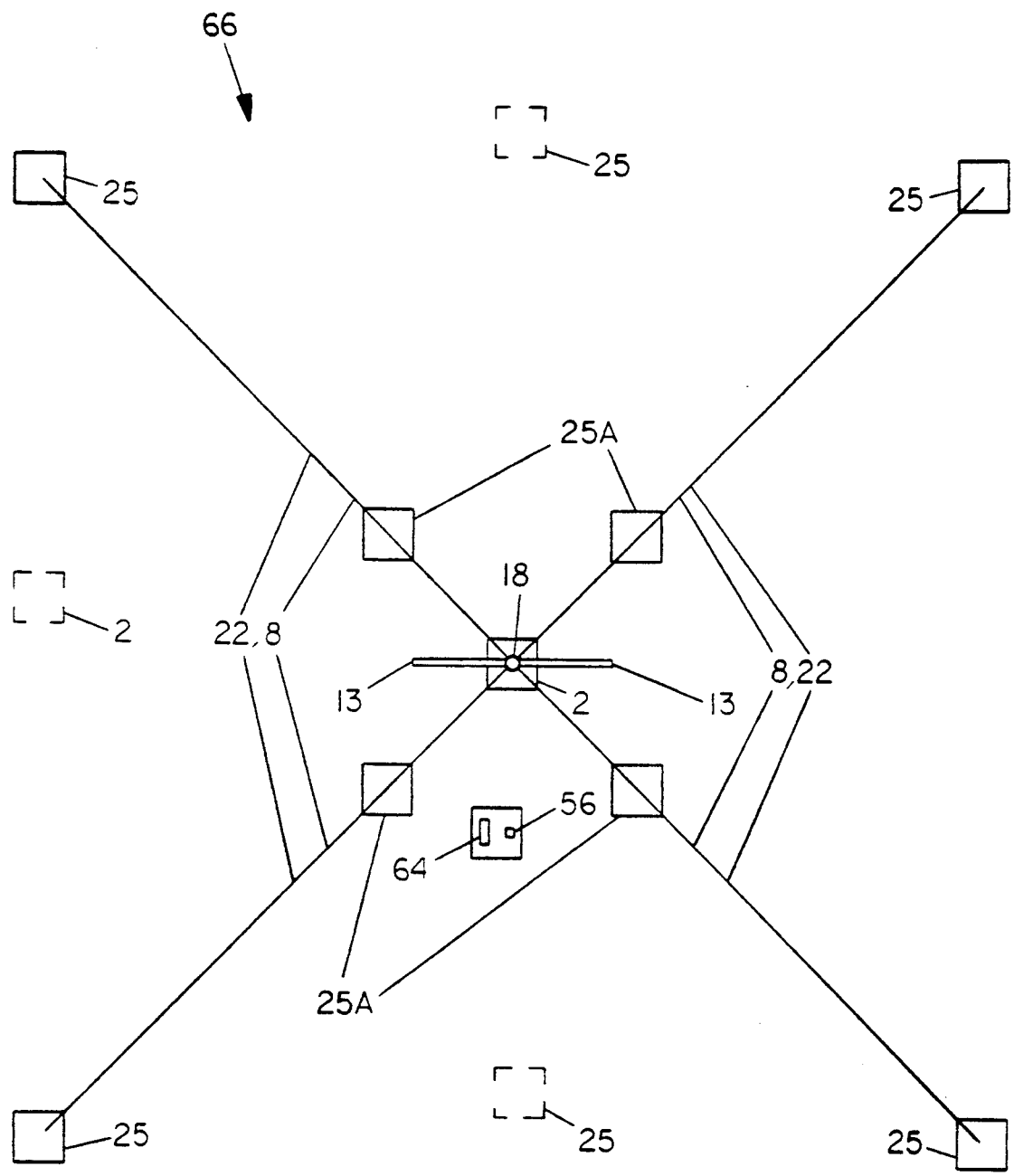
FIG. 2 is a top plan view of the cable anchor, central support structure, and erection winch ground embedded concrete footings layout for the 5, 10 and 16 KW turbines.

Referring to FIGS. 1 and 2, a Darrieus-type 5 KW vertical axis wind turbine 66 of this invention is illustrated as including a central support structure 39 including a hollow round support pipe 3 and a power conversion drive train mounting frame 68. The drive train mounting frame includes the rotor lower bearing housing 50, spacer beams 58, connecting beams 59, speed reducer mounting cross beams 60, and the support pipe stiffener 62. Support pipe stiffener 62 concentrically overlaps the outside diameter of support pipe 3. The drive train components, speed reducer 6, rotor brake 5 and motor-generator 4 are mounted in line with the rotor shaft 11 axis in frame 68. Erection hold gin pole 23 is also welded to the top of frame 68. Central support structure guy cables are also attached to frame 68. Most of the support pipe 3 has been removed to show greater detail. All of pipe 3 may be seen in FIG. 3.

Figure 4:
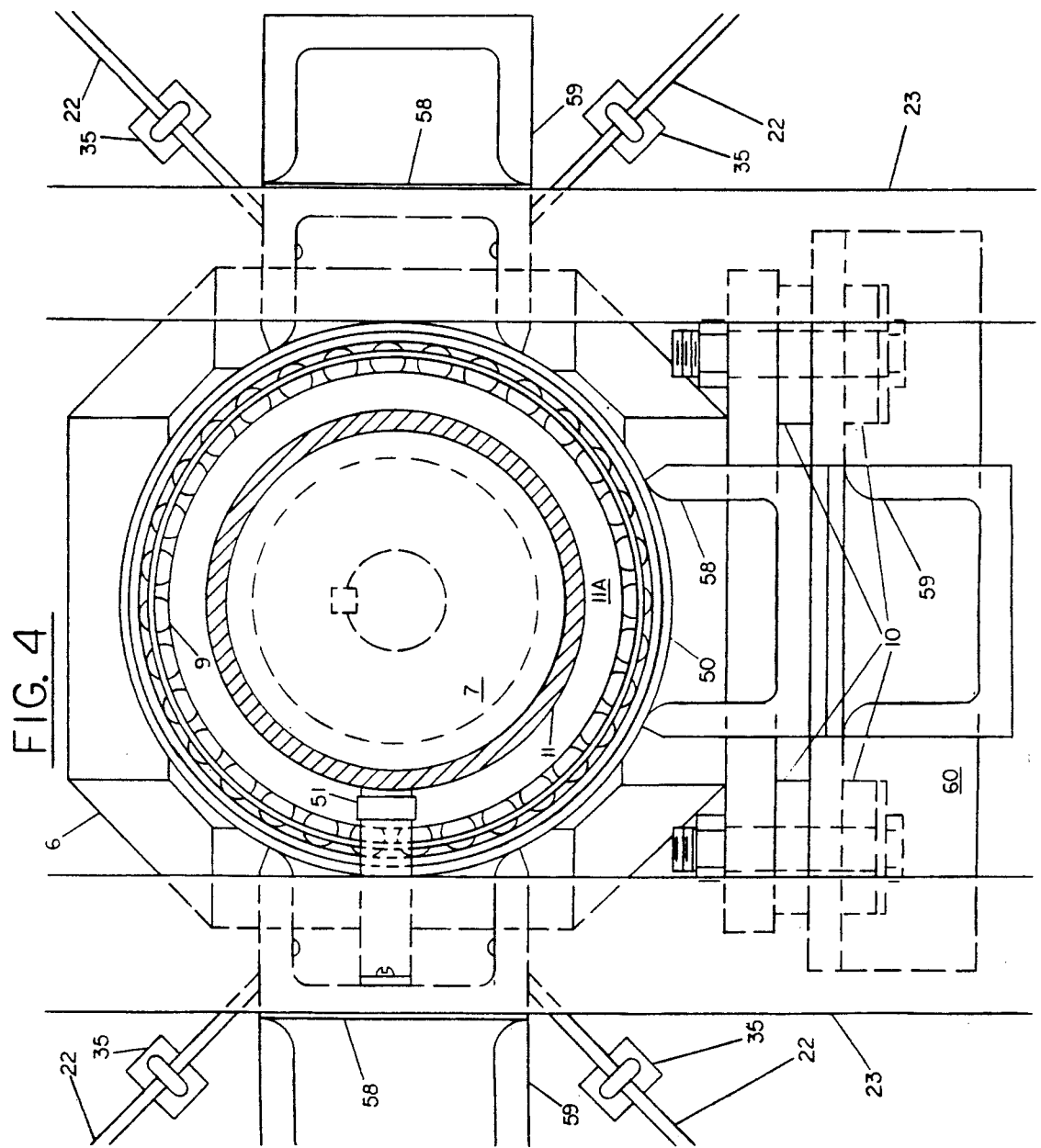
FIG. 4 is a top plan view taken on line IV—IV of FIG. 1 showing the lower rotor bearing and lower bearing housing, the bearing housing support and drive components mounting frame and the mounting points for the hold down gin pole frame.

The rotor lower bearing housing 50 concentrically overlaps and supports the rotor lower bearing 9 (shown in FIG. 4). The rotor lower bearing 9 concentrically overlaps and supports the rotor shaft 11 through a rotor shaft bearing shoulder. The hollow rotor shaft 11 supports rotor blades 13 shown in edge view. All four rotor blade ends are welded to four separate rotor blade end connecting brackets 15. The rotor blade end connecting brackets are separately pinned to the two rotor blade hubs 16.

FIG. 1 also shows a rotor shaft stiffener 12. In the 5 KW turbine stiffener 12 is a hollow round pipe concentrically mounted and welded to the outside diameter of hollow round rotor shaft pipe 11. In the 16 and 32 KW size turbines, stiffener 12 is solid and is welded to the inside diameter of two sections of hollow round rotor shaft pipe 11. The 10 KW turbine doesn't require a stiffener 12. In the 16 and 32 KW turbines stiffener 12 also acts as a concentric alignment and welding joint for the rotor shaft pipe 11 sections. Stiffener 12 is centered between the rotor shaft blade hubs 16. This stiffener hub centered position gives the best column load stiffness. The rotor shaft stiffener 12 also increases the torsional stiffness of the hollow rotor shaft 11 to reduce rotor blade and shaft fatigue.

FIG. 1 also shows the rotor blade support beams 52 and the rotor blade support beam hubs 53 and 53A. Support beam hubs 53 have been welded to the points of highest blade bending stress. This bending stress is caused by the centrifugal forces of rotation. The rotor blade support beams 52 also add to blade stiffness. This additional stiffness also reduces blade fatigue from the continuously changing direction of the blade relative wind force vector. Support beam 52 is a hollow round pipe that concentrically overlaps the hollow round pipe beam hubs 53 and 53A. This beam to hub pipe overlap is bolted together. The support beam and hub diameters are approximately one fourth to one half of the blade chord dimension. The smooth convex surface of the support beams 52 provide relatively low wind drag forces.

FIG. 1 also shows spaced above the upper blade hub 16 and support by the rotor shaft 11 and by a bearing shoulder is upper rotor bearing 14 and upper bearing housing 18. The upper bearing housing 18 concentrically overlaps the upper bearing 14. The upper bearing 14 concentrically overlaps rotor shaft 11. The upper rotor bearing 14 and upper bearing housing 18 form a rotor upper bearing assembly 71. Upper bearing assembly guy cables 8 are shown attached to upper bearing assembly guy cable attaching lugs 27. Lightning rods 19 are shown mounted to the upper bearing housing 18. Lightning rods 19 are electrically connected to grounding conductor 17. Grounding conductor 17 is attached to one of the upper bearing assembly guy cables 8 for electrical connection to one of the grounding rods 20. One guy cable tension adjustment and vibration dampening apparatus are installed in each of eight guy cables 8 and 22. Two guy cables one each 8 and 22 are attached to the nearest ground embedded concrete anchor footing 25 for the 5 KW turbine only. Central support structure guy cables 22 are also attached to the top portion of drive frame 68.

FIG. 1 also shows the central support structure anchor 2 embedded in the ground. The support structure anchor includes a number of metal structural members welded together and partially embedded in concrete. The single axis erection hinge pin or pins connect the central support structure 39 to the top of the central support structure anchor 2. Erection gin pole 21 is mounted near the erection pin 1 on the support structure.

FIG. 1 shows the rotor construction ratio of approximately one for all the turbines of this invention. The rotor construction ratio is the rotor shaft 11 distance in feet between blade hubs 16 divided by the maximum blade diameter in feet. The maximum blade diameter is perpendicular to the rotor shaft 11 and crosses the rotor shaft 11 midway between the blade hubs 16. Note that for all the turbines of this invention that the rotor blade 13 shape is roughly the same as shown in FIG. 1. The rotor blade hub 16 separation distance for the 5 KW, 10 KW, 16 KW, and 32 KW, turbines are roughly 16 ft., 23 ft., 27 ft. and 40 ft. respectively.

FIG. 2 shows the layout of guy cable anchor concrete footings 25 and 25A. The central support structure anchor 2 and erection winch 56 concrete footings are also shown in FIG. 2. For the 10 KW, 16 KW, and 32 KW turbines, the four central support structure guy cables 22 are individually anchored to the nearest one of four guy cable anchors 25A. FIG. 2 also shows in dashed lines one of the nearest sites for an additional central support structure anchor 2 and guy cables 25 for the 5 KW, 10 KW, 16 KW turbines only. The spacing between concrete footings 2 and 25 for the 32 KW turbine is greater. The centers of the four cable anchor footings 25 define the corners of the outermost square guy cable anchor outline. The 5 KW, 10 KW, and 16 KW turbine outermost square guy cable anchor outline is roughly 75 feet to a side. The 32 KW turbine outermost square guy cable anchor outline is roughly 109 feet to a side. The square guy cable anchor outline defined by the centers of guy cable anchors 25A is roughly 14 feet to a side. FIG. 2 also shows that a rotor diameter through the centers of the rotor blades also makes a 45 degree angle with lines drawn between the centers of opposite cable anchors 25. In FIG. 2 the rotor diameter line through the centers of rotor blades 13 is in parallel with the erection hinge pin 1 axis. Therefore the erection hinge pin axis makes a 45 degree angle with the guy cable anchor opposite corner lines.

Figure 3:
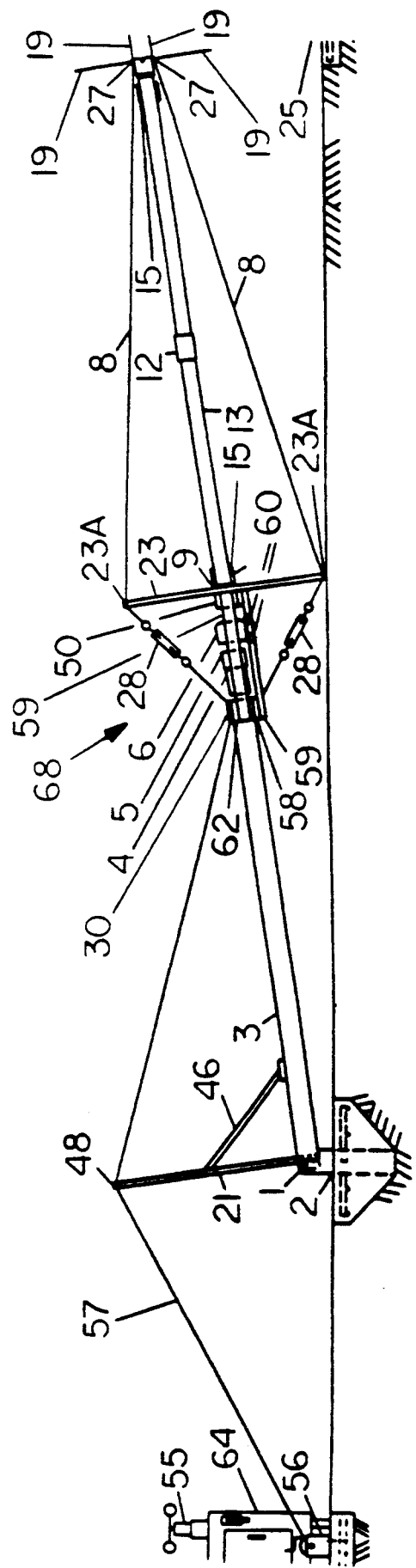
FIG. 3 is a side view of a fully assembled 5 KW two blade vertical axis wind turbine with cables set for erection.

FIG. 3 shows a side view of a 5 KW turbine ready for erection pivoting. The rotor blades 13 are set at equal distances from the ground. Two upper bearing guy cables 8 have been temporarily strung and tightened over the hold down gin pole 23 guide cups 23A. with temporary turnbuckles 28. The erection winch cable 57 has been strung over the erection gin pole 21 guide cup 48. One end of winch cable 57 is attached to stiffener pipe 62 at cable lug 30. The other end of cable 57 is attached to the drum of erection winch 56. The erection winch 56 is attached with concrete embedded bolts to the erection winch reinforced concrete footing. One temporary hold down cable turnbuckle 28 is attached to cable lug 30. The other hold down turnbuckle 28 is attached to frame 68 on the side opposite cable lug 30. The temporary hold down guy cables 8, hold the concentrically overlapping stacked assembly together. This concentric overlapping stacked assembly includes the rotor upper bearing assembly 71 overlapping the upper end of rotor shaft 11 and rotor lower bearing and central support structure 39 lower bearing housing 50, overlapping the lower end of rotor shaft 11. Erection winch 56 causes the turbine to rotate about the erection hinge axis to a vertical position essentially perpendicular to the ground plane. Note that erection hinge pin 1 axis is essentially parallel to the ground plane.

FIG. 4 is a top plan view taken along line IV—IV of FIG. 1 showing the top of the drive component mounting frame 68. FIG. 4 also shows a sectional view of hollow rotor shaft 11. Also shown is a top view of rotor lower bearing 9 and rotor shaft bearing shoulder 11A. FIG. 4 shows the concentric spacing and mounting of rotor lower bearing 9 and lower bearing housing 50 with respect to rotor shaft 11. Also shown is the lower rotor bearing grounding bypass brush 51. Also shown are hold down gin pole 23 beams welded to the frame 68 beams 58. Also shown are the four central support structure guy cables 22 with cable clamps 35. A hidden end view of rotor shaft flexible coupling 7 is also shown in FIG. 4.

FIG. 4 shows an end view of drive component frame 68 c-channel type beams 58 and 59. Note that beams 58 and 59 have the same cross section dimensions. Note also that beams 58 and 59 have three flat outside faces that form two square corners. The beam 58 and 59 web section is between the two flange sections forming these two 90 degree outside corners. Beams 58 and 59 are always welded together with flange ends of the outside beam butted to the outside web surface of the inside beam. This outside beam flange ends to inside beam web surface arrangement is seen in FIG. 4. Note in FIG. 1 that frame 68 spacer beam 58 is no longer than housing pipe 50 or stiffener pipe 62. Frame 68 beams 59 form the length of frame 68. In FIG. 4 note that beams 58 and 59 are easily aligned by clamping the outside flange surfaces in the same plane (flush) before welding. Note that round lower bearing housing pipe 50 fits into the open flange ends of spacer beams 58. This housing pipe 50 to spacer beam 58 fit makes for excellent axial alignment. Note that frame beams 58 and 59 are welded to stiffener pipe 62 in the same way as pipe 50 shown in FIG. 4. Note that round stiffener pipe 62 always has the same outside diameter as bearing housing pipe 50. Therefore pipes 50 and 62 have excellent axial alignment. In FIG. 4 more space can be made for a larger speed reducer 6. More than one spacer beam 58 can be welded together. The c-channel flange ends to web arrangement is repeated. FIG. 4 could show three or more c-channel ends to a stack, as suggested by FIG. 16 and FIG. 17. Again frame 68 axial alignment is maintained by clamping abutting c-channel outside flanges flush before welding.

FIG. 4 also shows, that for all the turbines of this invention, there are always three spacer beam 58 welded radial positions on both round pipes 50 and 62. The centers of these spacer beam 58 positions have radial spacing around these pipes of 90 degrees. The absence of a fourth spacer beam 58 position and an associated connecting beam 59 leaves one gap between pipes 50 and 62 larger than the other two gaps. This drive train mounting frame 68 gap provides access to mount the rotor power conversion components. These drive components include the speed reducer 6, rotor brake 5 and motor-generator 4. This mounting frame access gap is constructed, for all the turbines of this invention, such that it is on the frame 68 side opposite to the ground before pivot erection. Four of the eight speed reducer shock mounting pads 10 are shown bolted, along with the speed reducer mounting plate, to one of the two frame 68 cross beams 60.

FIG. 3 also shows the turbine electrical power and control enclosure 64 bolted to the erection winch concrete footing 65. Also shown in FIG. 3 is the turbine control wind tachometer 55.

Figure 5:
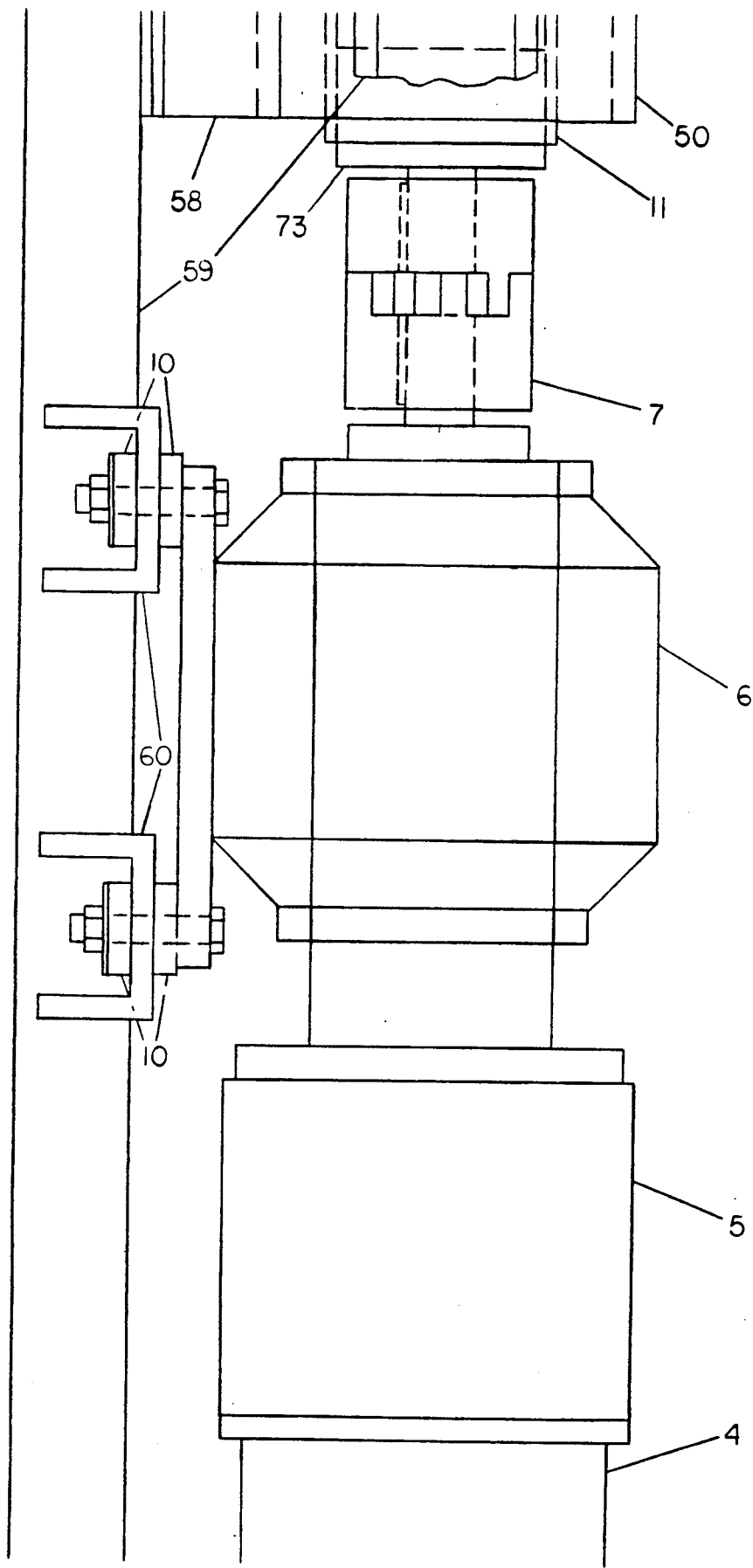
FIG. 5 is a side view of FIG. 4 showing the in line coupling of the 5 KW turbine rotor shaft, speed reducer, brake, motor-generator and these drive components mounting beams and shock pads.

FIG. 5 is a side view of the drive train mounting frame 68 with the near connecting beam 59 cut away. This figure shows the interlocking teeth of rotor shaft flexible coupling 7. These interlocking teeth will still transmit braking torque even if the interspaced rubber block teeth break out. Note that hollow rotor shaft 11 has a solid bottom plug 73. This rotor pipe 11 plug is used for the motor-generator speed reducer coupling 7 attachment. FIG. 5 shows a flanged shaft with a key way bolted to the plugged shaft 11 end. A coupling half from coupling 7 may be bolted direct to the rotor plug 73. FIG. 5 shows both drive mounting frame 68 cross beams 60 and four shock pads 10.

Figure 16:
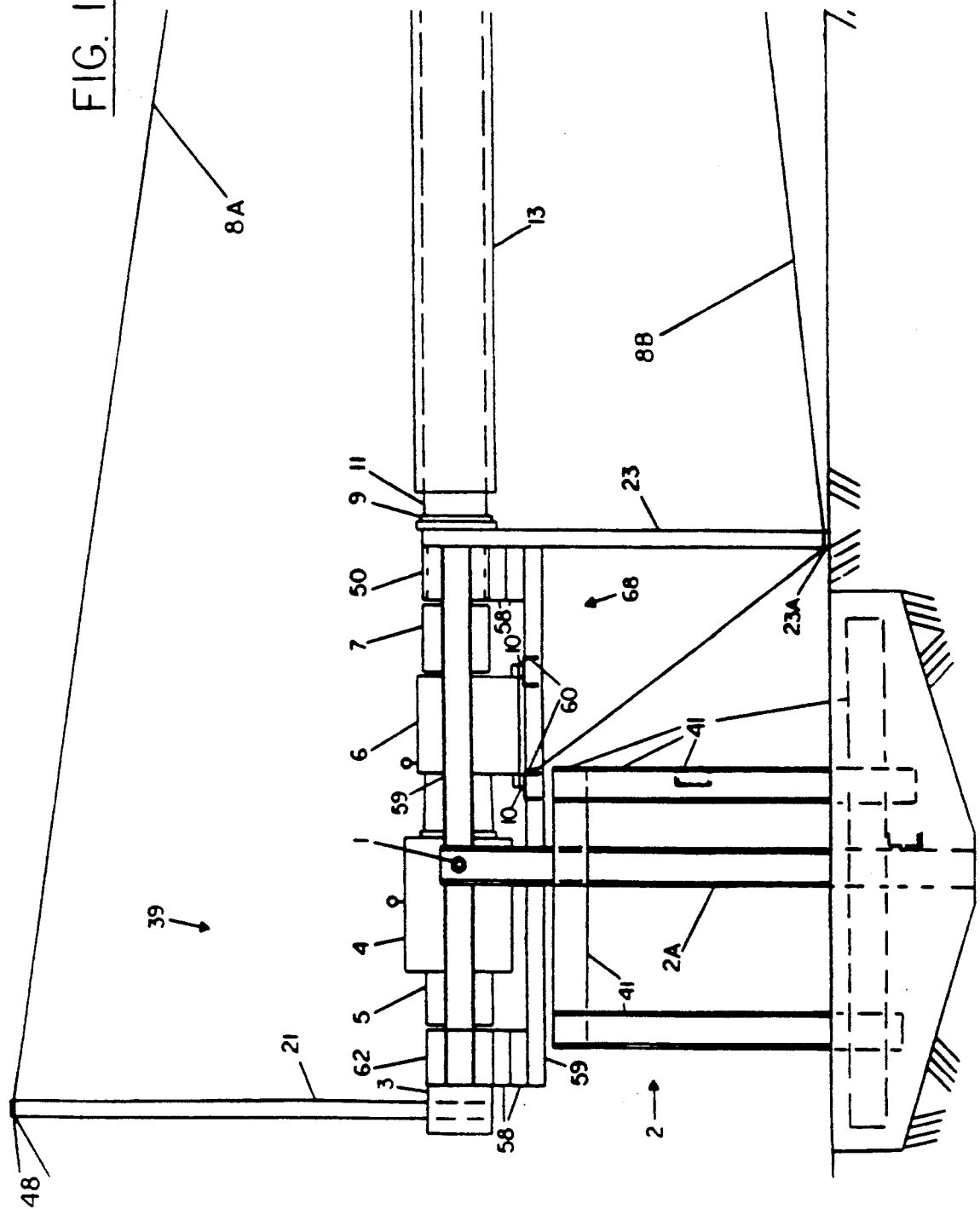
FIG. 16 is a partial side view of a 32 KW turbine ready for pivot erection.

FIG. 16 is a partial side view of the 32 KW turbine ready for pivot erection. Note that support pipe 3 has been greatly shortened from FIG. 3. FIG. 16 provides a good view of the central support structure 39 for all of the larger turbines 10 KW, 16 KW and 32 KW. The single axis erection hinge pins have been raised to approximately 5.5 feet above the ground for all the larger turbines. The single axis hinge still connects the turbine central support structure 39 to the ground embedded central support structure anchor 2. The erection hinge pin 1 axis, for the larger turbines 10 KW, 16 KW and 32 KW, is now constructed between the rotor lower bearing 9 and the erection gin pole 21. The erected rotor lower bearing position is approximately 11.5 feet above the ground for the 10 through 32 KW turbines. The central support structure 39, for the 10 through 32 KW turbines, is essentially the same length. The support pipe 3 is longest for the 10 KW turbine and shortest for the 32 KW turbine. The drive train component mounting frame 68 length and diameter increases with increasing turbine size through 32 KW.

Figure 17:
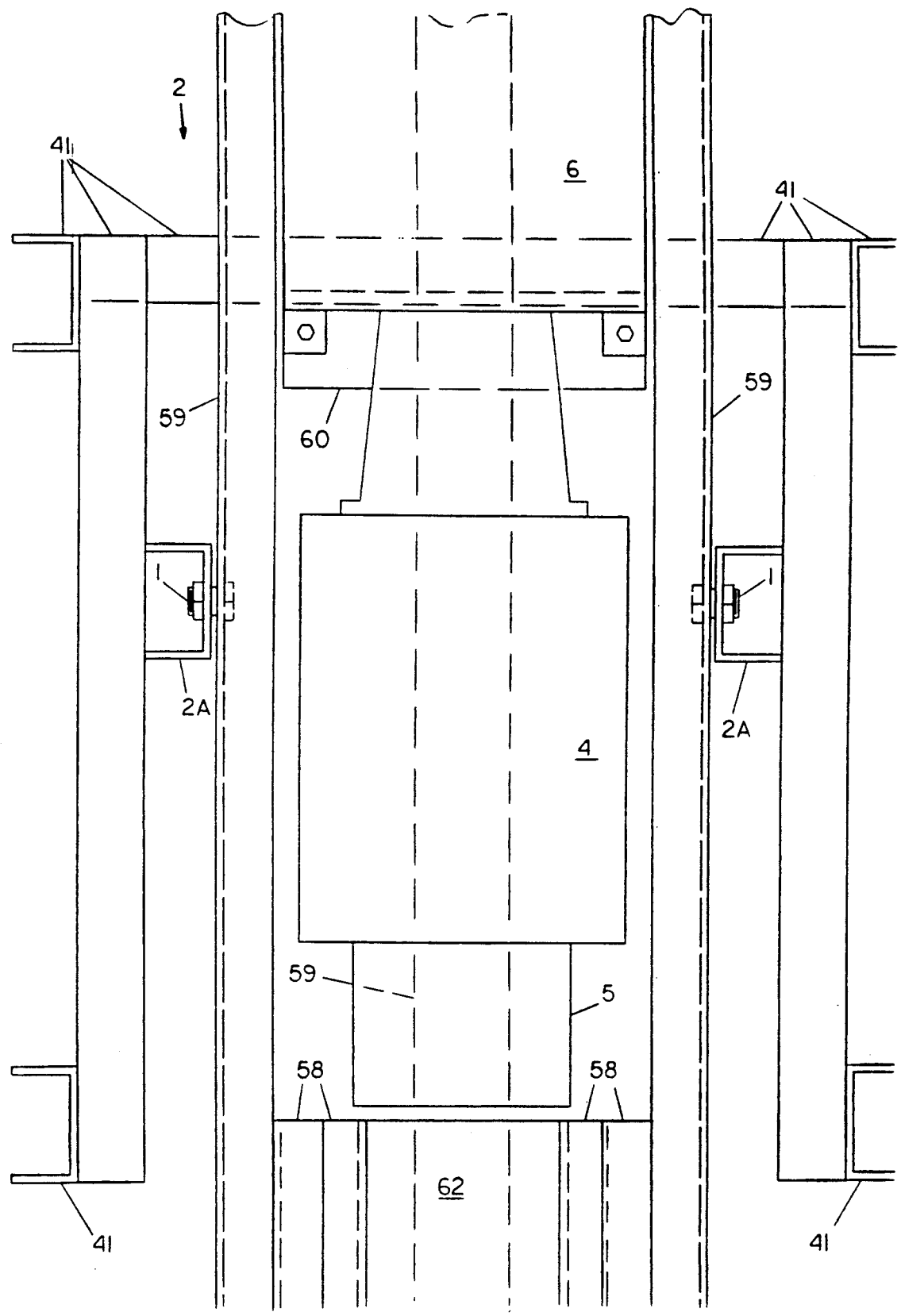
FIG. 17 is a partial top plan view of FIG. 16.

FIG. 16 also shows half of the central support structure anchor 2 center post 2A. Several support structure anchor 2 reinforcing beams 41 are also shown. Only one of the two central support structure hinge pins 1 are shown in this view. FIG. 17 shows both erection hinge pins 1 mounted in the tops of both halves of central support structure anchor 2 center post 2A. FIG. 17 also shows more support structure anchor 2 reinforcing beams 41. FIG. 17 also shows both frame 68 connecting beams 59 pinned to the support anchor 2. Note that the unsupported length of the hinge pins 1 is very small. The erection hinge pin axis, as in the 5 KW turbine, is essentially parallel to the ground plane.

FIG. 16 shows one upper bearing assembly guy cable 8 used as a temporary erection hold down cable. This temporary hold cable has one end attached to a rotor upper bearing housing cable lug 27 (not shown). The other end of this temporary erection hold down cable is attached to turnbuckle 28. Turnbuckle 28 is also attached to drive frame 68. This temporary hold cable is strung over the hold gin pole 23 cable guide cup 23A. The upper bearing guy 8 attached to the opposite upper bearing cable lug 27, is used as both a hold down cable and a erection winch cable. This temporary erection winch cable is strung over the erection gin pole 21 cable guide cup 48 with the opposite end attached to the erection winch 56 drum (not shown). Turnbuckle 28 adjusts the length of the hold down cable to avoid undue rotor bearing stress during erection pivoting. Erection winch 56 (not shown) causes the turbine assembly to pivot about the hinge pin 1 axis to a vertical position, by pulling the temporary winch cable 8. The turbine is erected to a position essentially perpendicular to the ground plane. The four upper bearing guy cables 8 and the four central support structure guy cables 22 are attached to the guy cables anchors 25 and 25A as shown in FIG. 2. The lengths and tension are adjusted for these eight guy cables to support the turbine in the wind. The four upper bearing guy cable 8 tensions should nearly be the same. The four support structure guy cable 22 tensions should also be nearly equal but not necessarily the same as the cable 8 tension.

In FIG. 1 note that the motor-generator 4 provides the initial rotor starting rotation power. The motor-generator 4 shaft speed is reduced by the speed reducer 6. Once the motor-generator 4 drives the rotor shaft 11 and rotor blades 13 to a high enough rotational speed the wind begins to drive the turbine rotor. The wind Would drive the rotor to a much higher rotational speed except the motor-generator reverses the direction of torque to oppose the turbine rotor shaft torque direction. The motor-generator torque equals the wind induced turbine rotor shaft torque at a speed a few percentage points higher than motoring speed. For a standard four magnetic pole induction motor full load motoring speed is 1740 RPM. This induction motor-generator has a full load generating speed of 1860 RPM. The turbine rotor now drives the motor-generator 4 through the motor-generator speed reducer 6. This speed reducer 6 could now be referred to as a turbine rotor speed increaser. An independent magnetic four pole field motor-generator charging a battery or electrolyzing water would reverse to generating torque at very similar speeds.

Figure 6:
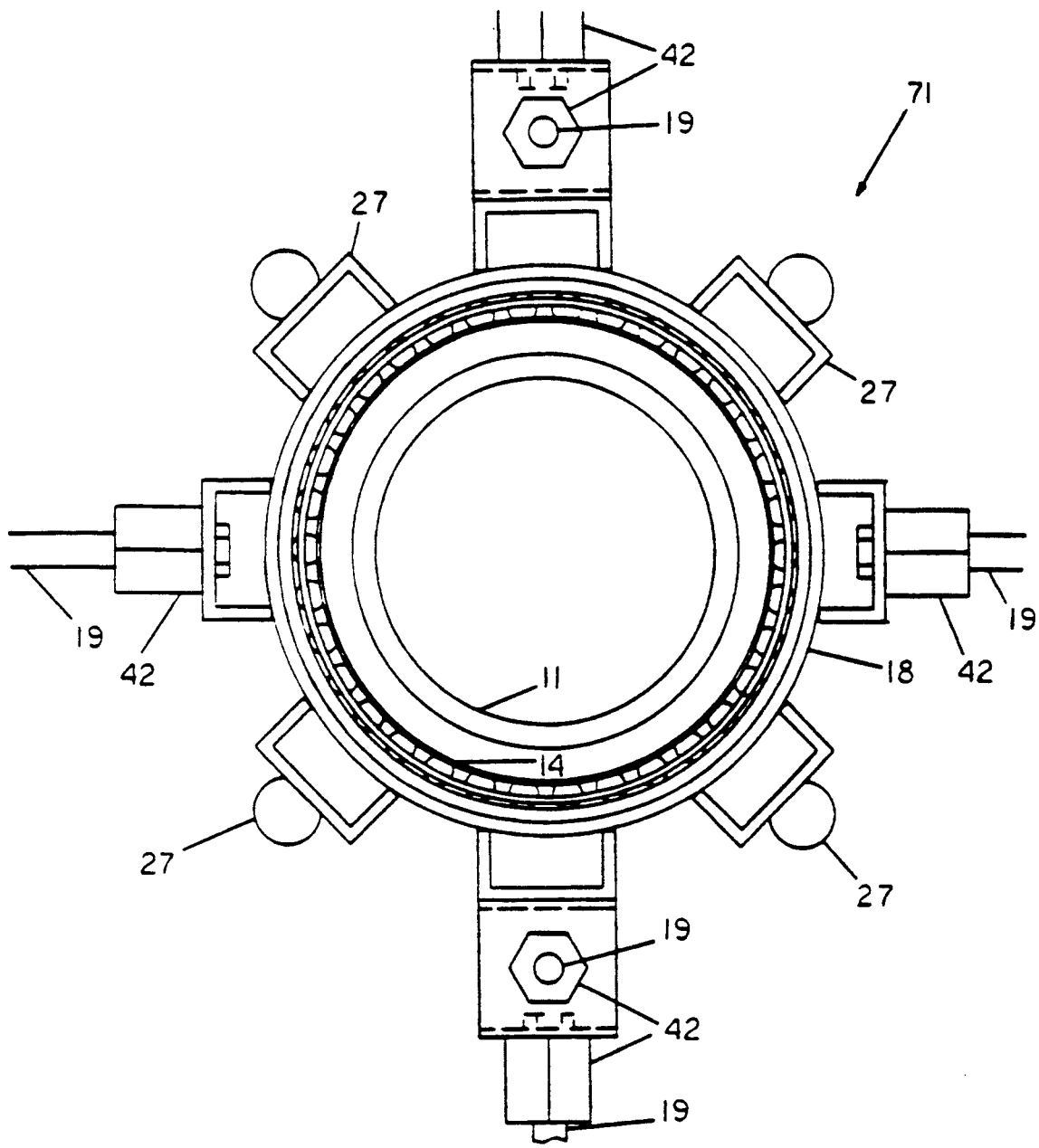
FIG. 6 is a sectional view taken on line VI—VI of FIG. 1 showing the top plan view of the rotor upper bearing and housing. Rotor upper bearing housing lightning rod attachments and guy cable attaching lugs are also shown.

FIG. 6 shows a section view taken along line VI—VI of FIG. 1. Shown are the six lightning rods 19 with their insulated mounted standoffs 42 mounting to rotor upper bearing housing pipe 18. Also shown is the end of hollow rotor shaft 11 concentrically spaced inside housing 18 by rotor upper bearing 14. Also welded to the side of pipe housing 18 are the upper bearing assembly guy cable lugs 27. Housing pipe 18 has a top cover plate that is not shown. The rotor upper bearing assembly 71 includes the rotor upper bearing 14 and the rotor upper bearing housing pipe 18.

Figure 7:
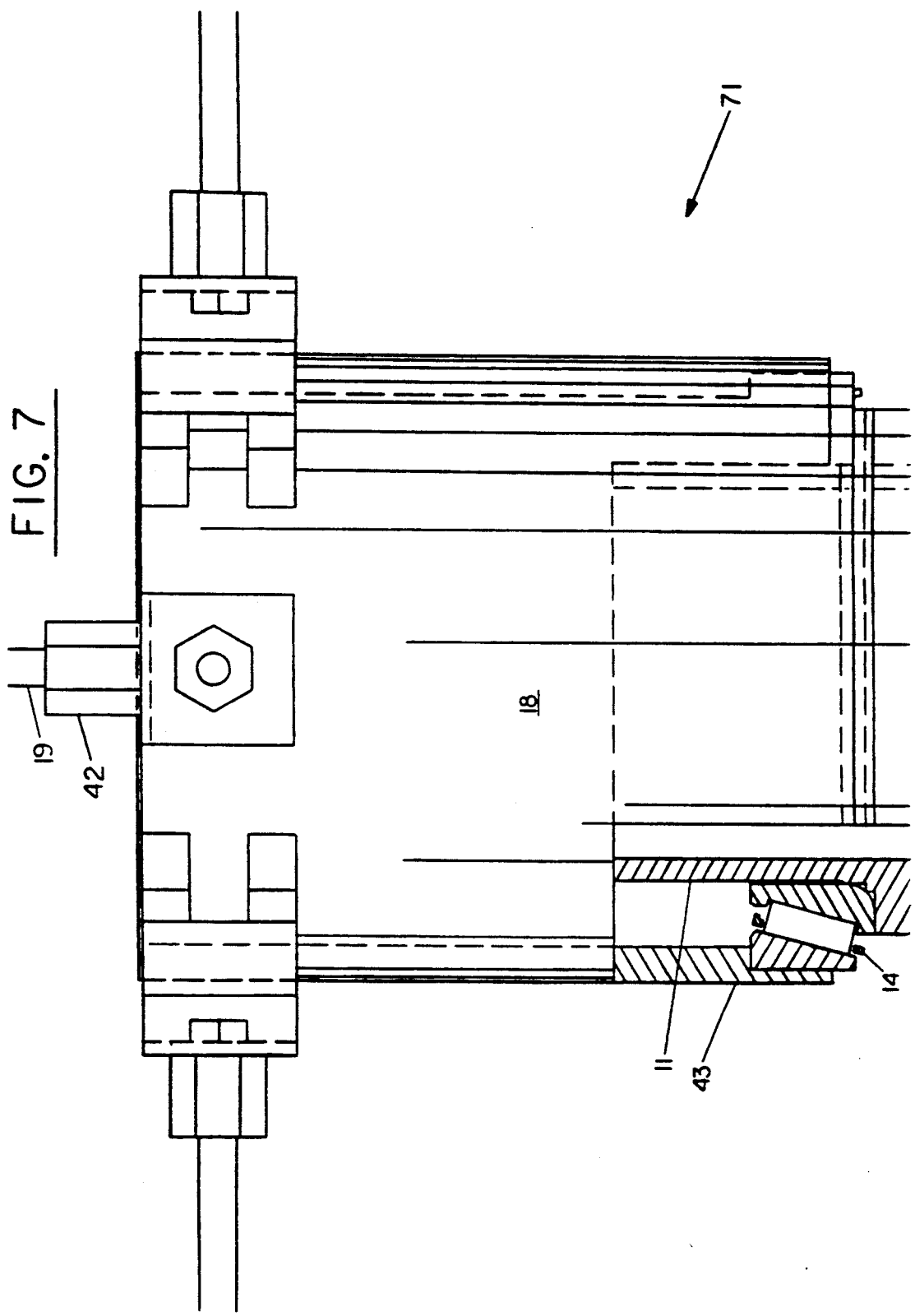
FIG. 7 is a side view of FIG. 6 showing the upper bearing housing with a partial cut-away view of the rotor upper bearing.

FIG. 7 shows the side of the rotor upper bearing assembly 71. Also shown is a partial cutaway of housing 18 to show the side of rotor upper bearing 14.

Figure 8:
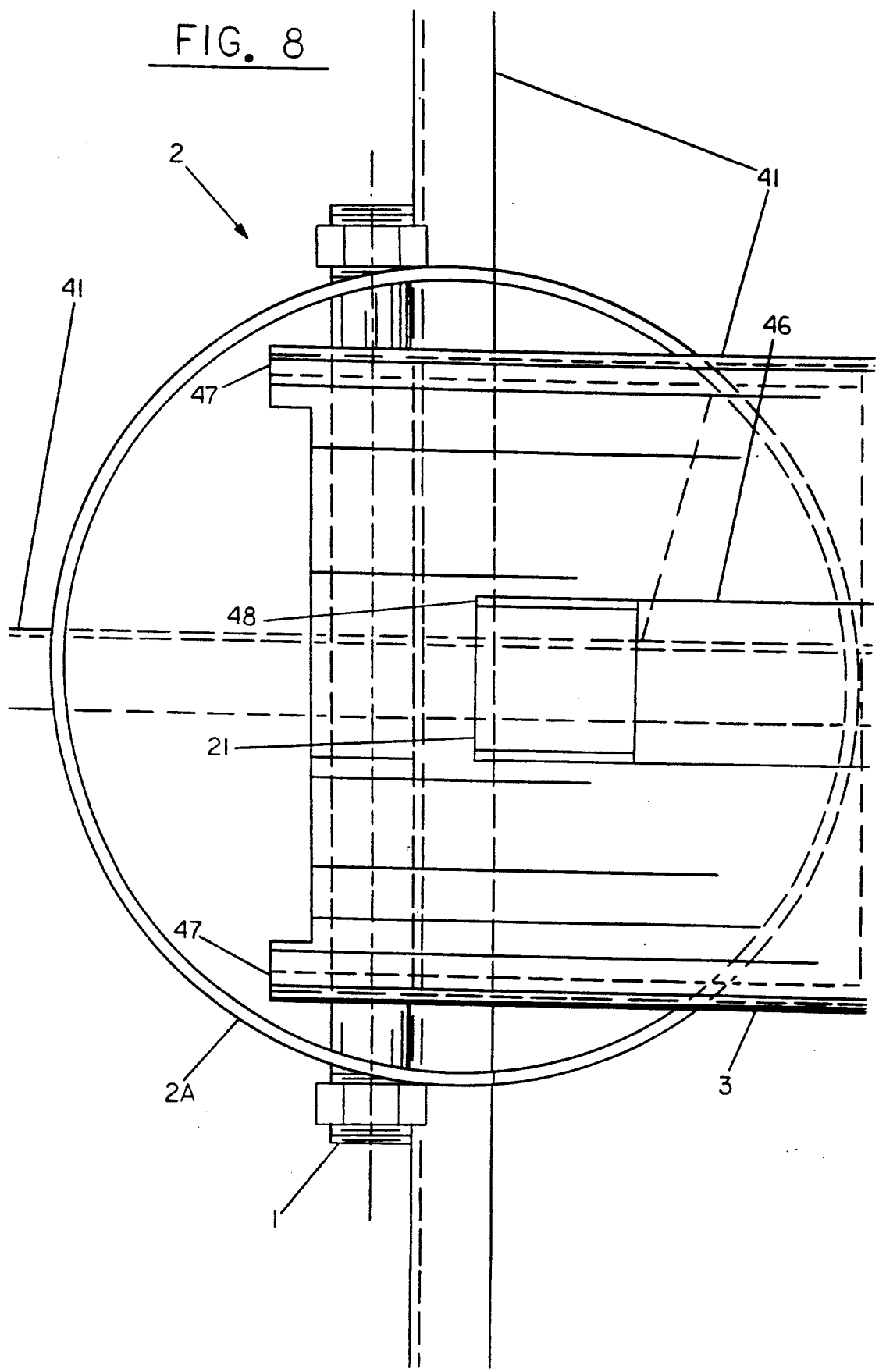
FIG. 8 is a top view of the central support structure anchor for the 5 KW turbine. A side view of the lower end of the central support structure is also shown in a horizontal position and with the erection hinge pin connection and the end of the erection gin pole.

FIG. 8 shows a top view of the 5 KW central support structure anchor 2. Also shown is anchor 2 center post 2A with single axis threaded erection hinge pin 1 and anchor reinforcing beams 41. The bottom end of support pipe 3 is shown in a horizontal position with support pipe bottom inside stiffener pipe 47. The end of the erection gin pole 21 is also shown with c-channel turbine hoisting cable guide cup 48. Also shown is erection gin pole 21 brace 46.

Figure 9:
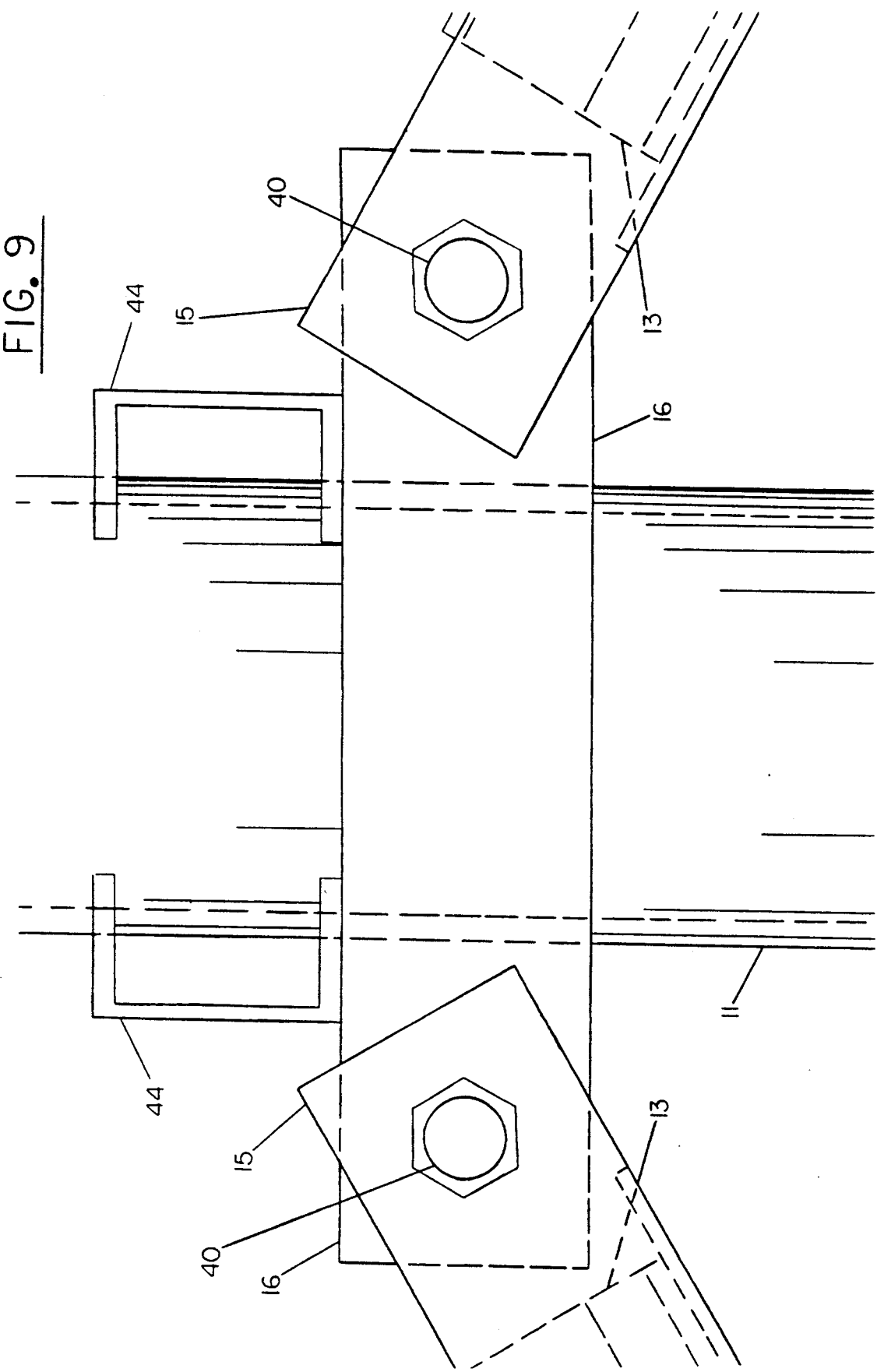
FIG. 9 is a side elevation view of the 5 KW turbine upper rotor blade hub connected to both upper rotor blade end brackets with threaded rotor hub connector pins.

FIG. 9 shows the 5 KW turbine upper rotor blade hub 16. The blade hub 16 beams are overlapped by the blade end connecting bracket 15. The blade hub 16 and blade end connecting bracket 15 are connected by a threaded blade hub connecting pin 40. Blade hub 16 is made from two c-channel beams. These two c-channel beams have been cut with a partial circular arc across the two channel flanges. These two circular arc flange notches are centered at half the length of the beams. These beam flange notches have the same arc radius as the outside of hollow rotor shaft 11. These flange notches allow the beam flanges to partially overlap the rotor shaft 11 outside cylinder. These blade hub 16 beam flange notches provide several inches of beam flange to rotor shaft contact. Blade hub stiffener beams 44 have similar flange notches. The end view of beams 44 shows the beam flange and rotor shaft 11 overlap.

Figure 10:
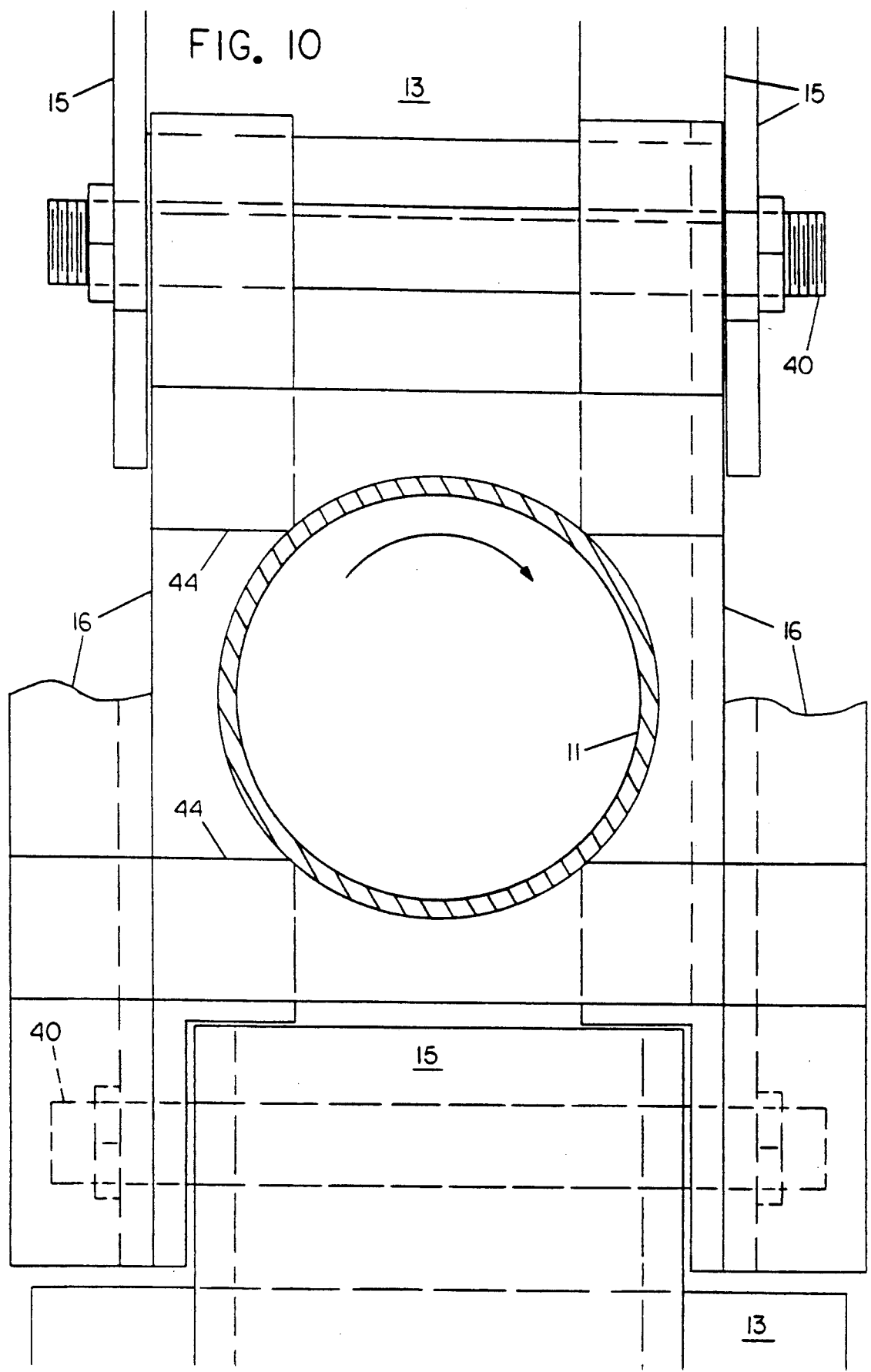
FIG. 10 is a partial top plan view along section line X—X of FIG. 1.

FIG. 10 is a sectional view of the top of part of the 5 KW upper blade hub. FIG. 10 shows a blade 16 with two different hub ends. Also shown in FIG. 10 is a section view of the 5 KW size hollow rotor shaft 11. In FIG. 10 the blade hub 16 end with the overlapping bracket 15 shows a 5 KW configuration. The other FIG. 10 blade hub 16 half (with threaded hub connecting pin 40 shown completely hidden) has beams that overlap the blade end bracket 15. This other FIG. 10 blade hub 16 half shows a modified version of the 10 through 32 KW blade hub arrangement. FIG. 10 also shows the notch to rotor shaft contact line. The blade hub 16 c-channel beams are welded along this flange circular notch to rotor shaft contact lines. Blade hub stiffener beams 44 are also welded along their flange notch to rotor shaft contact lines. Blade hub stiffener beams 44 are also welded to the blade hub 16 beams.

The 10 through 32 KW blade hub configuration shown in FIG. 10 is shown with smaller c-channel blade hub 16 beams and blade end bracket 15 to be in proportion with the 5 KW size rotor shaft. The 10 through 32 KW turbine blade hubs 16 also have notched c-channel beams welded to the rotor shaft in the same way as the 5 KW turbine arrangement. The 10 through 32 KW blade hub 16 has two additional c-channel beams welded web to web one to each shaft welded channel as shown in FIG. 10. These web to web c-channels form an I-type beam cross section. The blade hub 16 shaft notch welded channels have the end flange sections removed. These missing hub beam flanges allow the hub beams to closely overlap the blade end brackets 15. This blade end bracket close hub overlap keeps the cantilevered length of blade hub connecting pin 40 to a minimum. Note that flat rectangular metal stock can be welded to thicken a blade hub web or blade end bracket flange where the blade connecting pin 40 is supported. Note also in FIG. 10 that the hub shaft notch depth may be adjusted to accomodate any connecting pin 40 support section thickening. Note also in FIG. 10 that blade hub stiffener beam 44 is used on all turbines 5 through 32 KW. Blade hub stiffener beam 44 notches can be made deeper to maintain a near, blade hub beam flange to rotor shaft, complete circle. Blade hub connecting pin 40 support section thickening may be necessary to overcome hub connecting pin 40 shear stress due to blade centrifugal loads.

Figure 11:
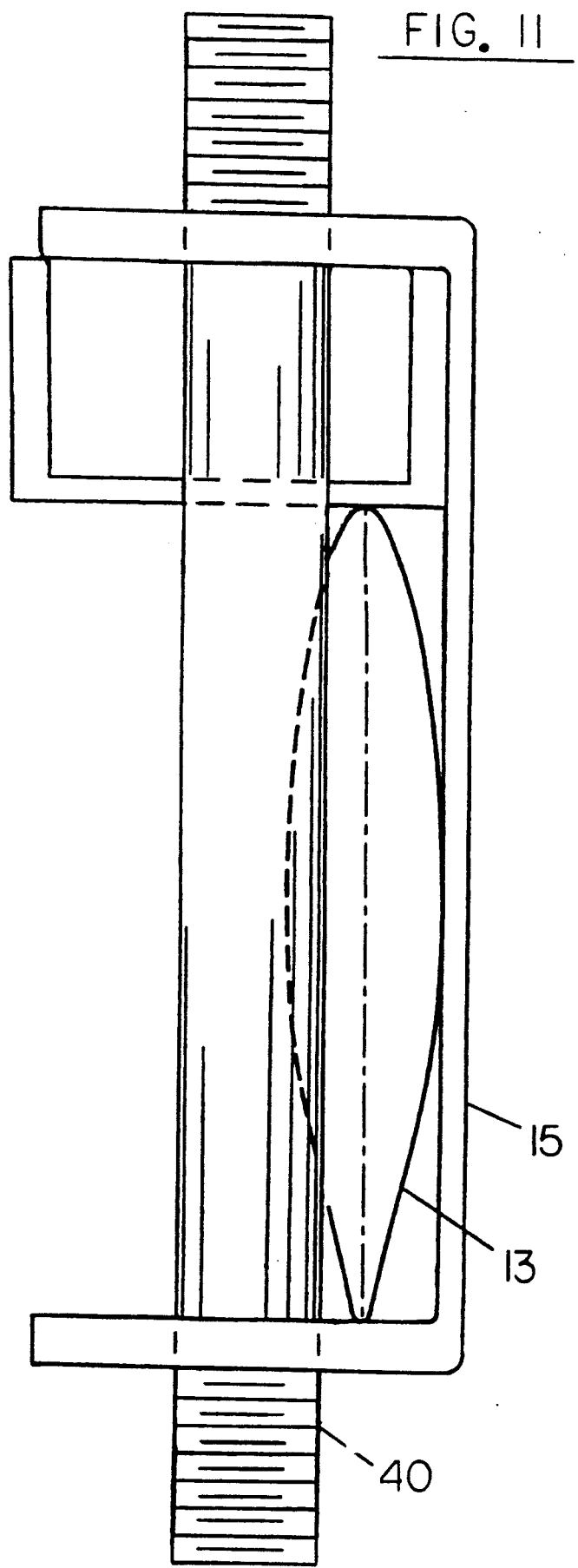
FIG. 11 is an end view of a solid rotor blade and rotor blade end to blade hub connecting bracket with a threaded rotor blade hub connecting pin, for the 5 KW turbine.

FIG. 11 shows an end view of the 5 KW turbine solid aluminum rotor blade 13 with an aluminum blade end connecting bracket 15 attached. Note that the threaded blade hub connecting pin 40 is mounted closer to the end of bracket 15 than the solid blade end. Blade end bracket 15 is two different c-channel beams welded together. Bracket 15 is also welded to the leading and trailing edges of solid blade 13.

Figure 12:
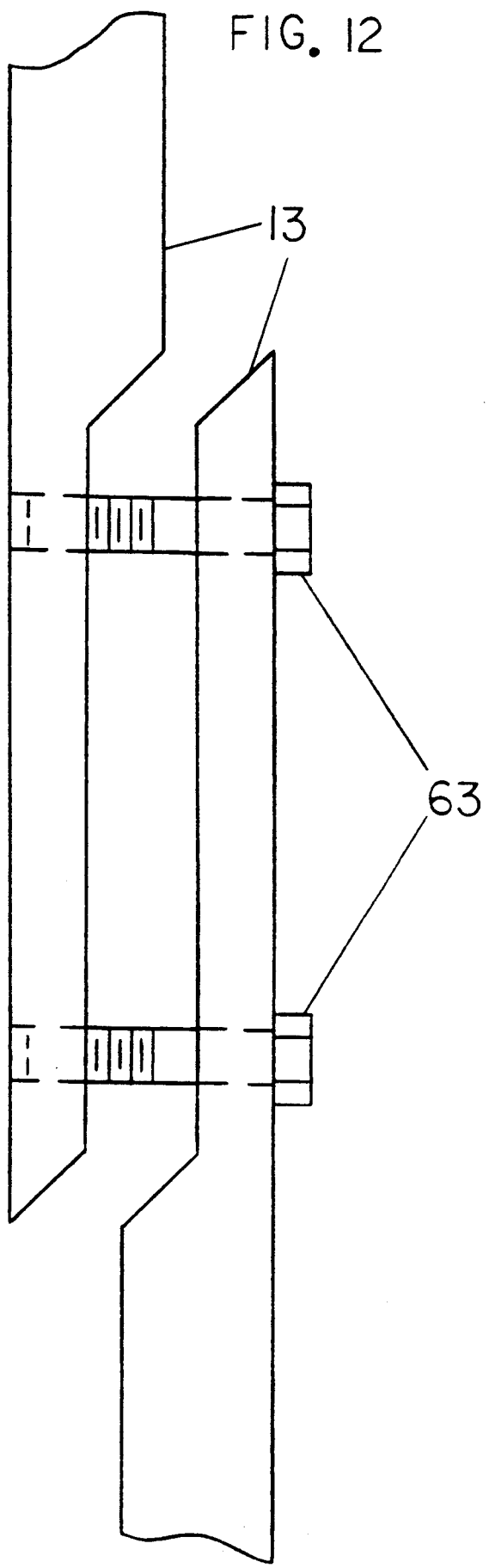
FIG. 12 is a blade leading edge view of a solid rotor blade joint connecting two sections of solid rotor blade.

FIG. 12 shows a view of the leading edge of a solid aluminum rotor blade 13 at a blade joint. This solid rotor blade 13 joint is made with at least four bolts 63.

Figure 13:
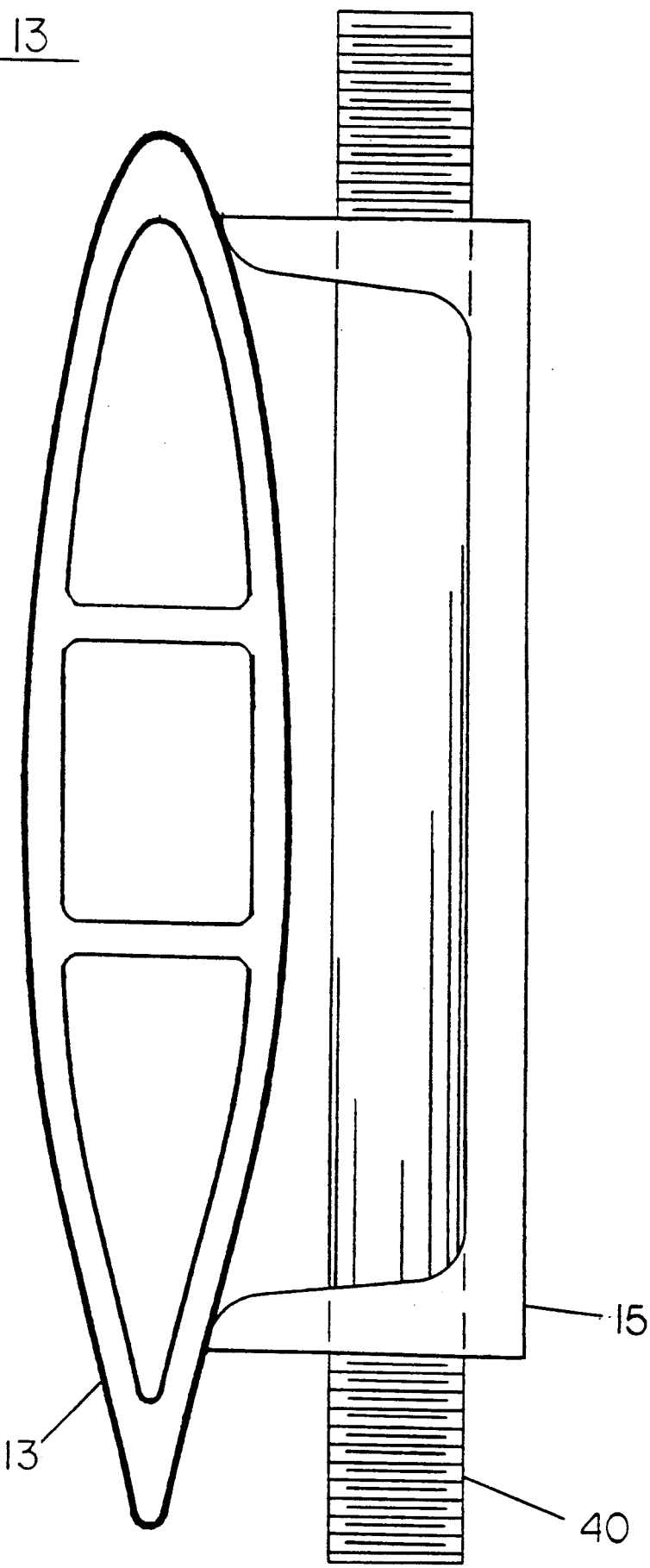
FIG. 13 is an end view of a hollow rotor blade with blade end to blade hub connecting bracket and connecting pin.

FIG. 13 shows the end of the 10 through 32 KW turbine hollow aluminum rotor blade 13 with aluminum blade end connecting bracket 15 welded to it.

Figure 14:
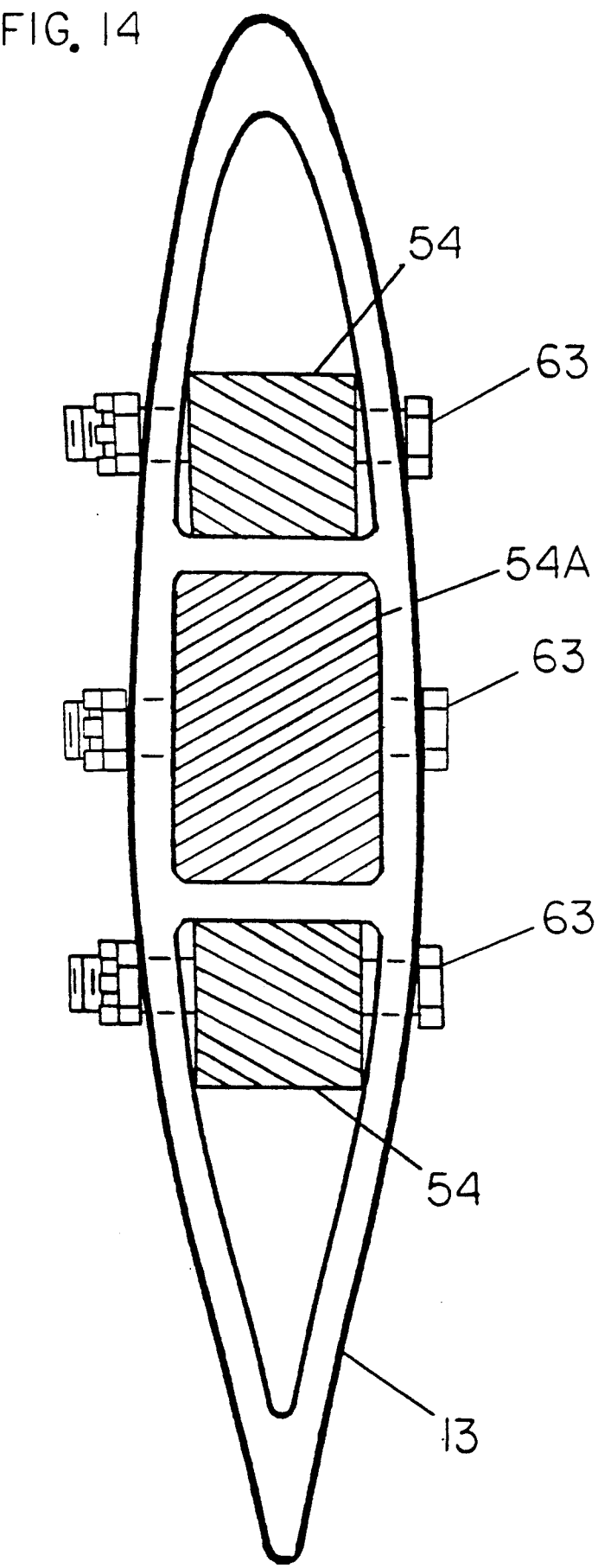
FIG. 14 is a cross section view of a hollow blade at a joint connecting two sections of hollow rotor blade.

FIG. 14 shows a cross section view of a hollow blade 13 joint. Note that solid rectangular aluminum bars 54 and 54A extend at least 1.5 times the blade chord length in to each blade 13 section. At least eighteen bolts 63 are installed for each hollow blade joint.

Figure 15:
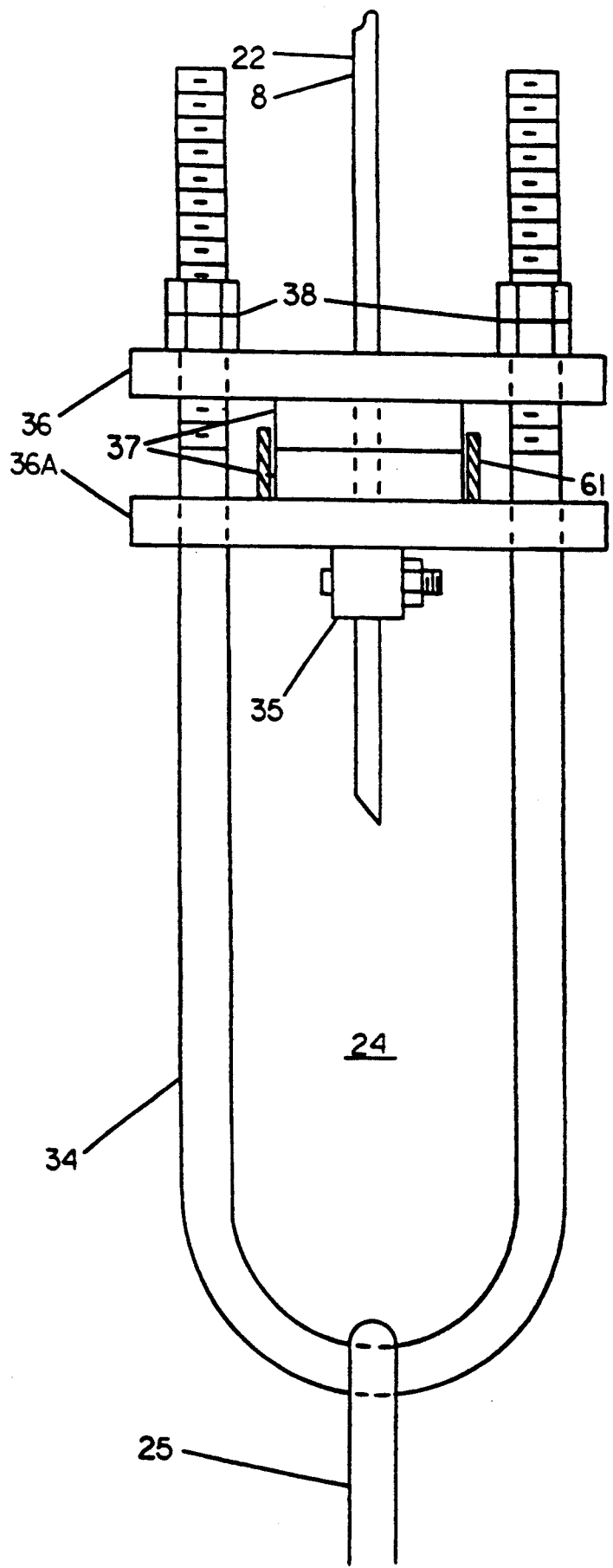
FIG. 15 shows the guy cable tension and vibration dampening apparatus for the turbine of FIG. 1.

FIG. 15 shows a guy cable tension adjustment and vibration dampening apparatus 24. Cable apparatus 24 includes a threaded u-shaped clevis 34. Clevis 34 is passed through the closed metal loop of cable anchor 25 or 25A. Clevis rectangular metal plates 36 and 36A have holes to engage both clevis 34 threaded ends and a guy cable end either 22 or 8. Note that FIG. 1 shows the closed metal loop hook of cable anchor 25. This metal hook is securely attached to metal reinforcing beams embedded in the concrete of anchor 25. Central support structure cable anchor 25A is constructed in the same way as cable anchor 25. Cable clamp 35 keeps the guy cable end engaged with the clevis plates. Between clevis plates 36 and 36A are solid rubber disks 37 and disk retaining pipe 61. Retaining pipe 61 is mounted to clevis plate 36A through a threaded pipe nut. The retaining pipe 61 nut is welded to plate 36A. Clevis nuts 38 keep the clevis plates 36 and 36A engaged on clevis 34. The initial cable slack is taken out by adjusting the position of cable clamp 35. Guy cable tension is then increased by turning nuts 38 to make the closed length of clevis 34 shorter. The cable tension tends to draw clevis plates 36 and 36A together. Rubber disks 37 deform slightly while separating plates 36 and 36A. The rubber disks have a shock and vibration energy absorbing capacity. Retaining pipe 61 is a safety device. In the event that disk 37 are not replaced per an inspection and maintenance schedule, the disks may dry out to the point of cracking. Retaining pipe 61 will not allow plate 36A move a great distance should the disks 37 disintegrate. Note that clevis plate 36A always engages the smooth un-threaded surfaces of clevis 34. Note also that retaining pipe 61 has several diameters and lengths depending on the disk 37 diameter and the number of them in a clevis plate spacing stack.

Figure 18:
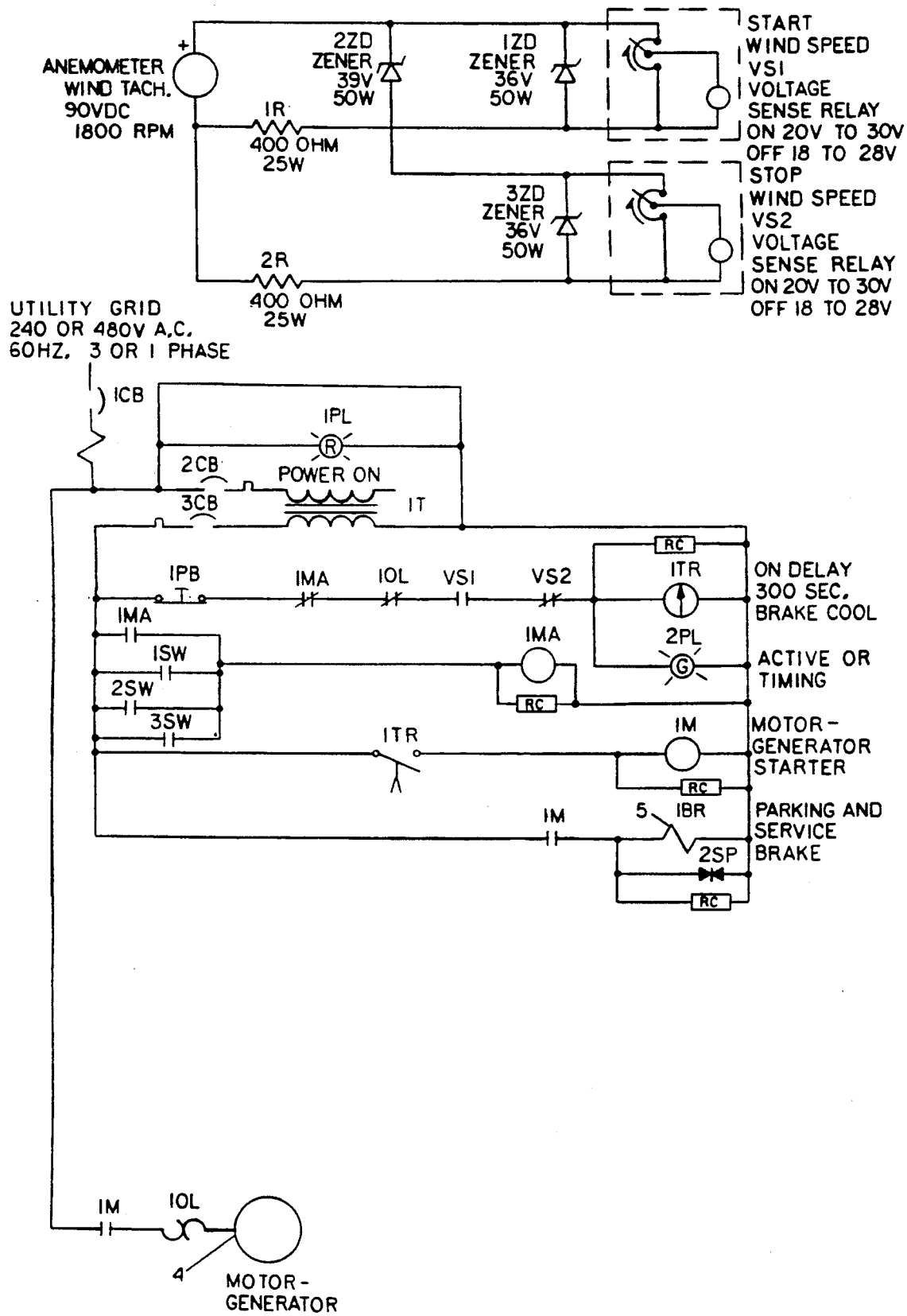
FIG. 18 is an electrical control and power one line diagram of an induction motor-generator utility connection for any turbine of this invention.

FIG. 18 shows an electrical control and power one line diagram for any turbine of this invention with an induction motor-generator 4 utility grid connection. Circuit breaker 1CB 68 is closed to energized the turbine electrical control. Rotor parking and service brake 5 has fail safe operation. Rotor parking and service brake 5 electric operating coil 1BR must be energized to release the spring loaded brake pads. 1T is alternating current control transformer that can be connected to convert either 240 or 480 volts single phase to 120 volts. Circuit breaker 2CB protects the 1T primary winding and connection wiring against electric current overload and short circuit. Circuit breaker 3CB protects the 1T secondary winding and all connecting wiring and connected devices against electric current overload and short circuit. 1SP is a high voltage suppressing device. 1SP protects all the 1T secondary connected elements including 1TR, 1M, 1MA and 1BR. VS1 and VS2 are standard adjustable direct current voltage sensing electronic relays. 1ZD, 2ZD and 3ZD are zener diodes. 1ZD and 3ZD protects VS1 and VS2 respectively from excess voltage. VS1 energizes at the lowest turbine starting wind speed. VS2 energizes for wind speeds above the turbine maximum operating wind speed. When VS2 energizes the induction motor-generator 4 is immediately disconnected from electric power and the rotor brake 5 is immediately engaged. Setting 1CB, 2CB and 3CB open would provide the same rotor braking action. The wind tachometer 55 generates the direct current voltage proportional to wind speed that energizes relays VS1 and VS2. 1R and 2R are wind tachometer 55 electric current limiting resistors. 2ZD increases the voltage sensing range starting voltage for relay VS2.

1PL is a red pilot light that illuminates when the turbine electric control power is present. 1TR is a standard adjustable electronic timing relay. 1TR energizes after a time delay when control voltage is continuously applied. 1TR is set to provide a turbine start delay of roughly 900 seconds. This turbine start delay allows the control to ignore wind gusts just above the starting wind speed. This turbine start delay also allows time for the rotor brake 5 to cool during gusty high speed winds. Green pilot light 2PL illuminates when control voltage is applied to 1TR. A timed 1TR contact energizes the motor-generator starter 1M and connects the motor-generator 4 to the utility grid. 10L is the motor-generator 4 electric current overload relay which can trigger a turbine brake stop. Accelerometer switches 1SW and 2SW causes the turbine to brake when vibration or turbine axis motion is excessive. Switch 3SW is a centrifugal speed switch that causes rotor braking when the motor-generator 4 shaft speed is excessive. Relay coil 1MA latches the vibration or over speed stops as long as turbine control power is applied. Stop start pushbutton 1PB is a mechanically latched when depressed pushbutton operator. 1PB has a mushroom head, when depressed immediately engages the rotor brake 5. The 1PB mushroom head must be firmly pulled out to the "on" position. This turbine electrical control can only be enabled to operate when all the following are set to the "on" position; 1CB, 2CB, 3CB and 1PB.

Figure 19:
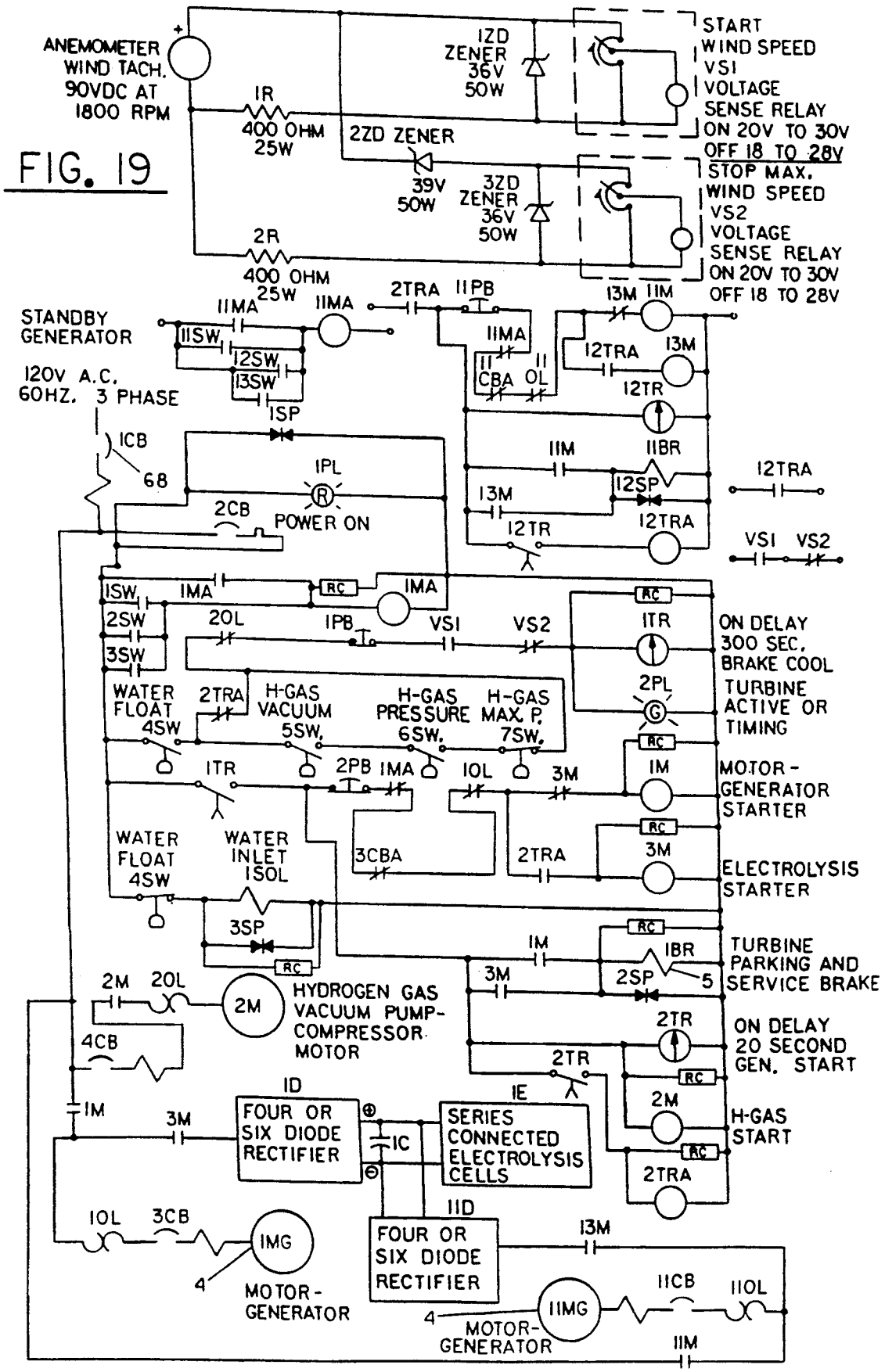
FIG. 19 is an electrical control and power one line diagram for a magnetic field motor-generator and water electrolysis load for any turbine of this invention.

FIG. 19 is an electrical control and power one line diagram for any turbines of this invention with an independent magnetic field motor-generator 4 and water electrolysis load. This turbine electrical system must not be connected to the utility power grid. This turbine motor-generator 4 can develop alternating current voltage and power without the aid of external electrical power. This independent magnetic field motor-generator 4 could be a safety hazard to utility maintenance personnel if connected to the utility grid. Hydrogen gas is generated by electrolyzing water with VAWT generated electric power on this private non-utility network. This private electric power generating network would be confined to several adjacent farming-type acres. The purpose of storing wind energy as hydrogen gas would be to oxidize (burn) it at a convenient time, in all the carbon fuel applications. These hydrogen gas applications would include; converting coal and oil fired electric power plants to burn hydrogen gas, convert home heating plants to burn hydrogen gas, convert transportation vehicles to burn hydrogen gas, distribute hydrogen gas in converted natural gas pipe lines. The principal exhaust product from hydrogen gas combustion is water vapor. The electrical control and one diagram of FIG. 19 describes such a private power network.

Electric components VS1, VS2, 1TR, 1BR, 1ZD, 2ZD, 3ZD, 1SP, 1CB, 2CB, 10L, 1PL, 2PL, 1SW, 2SW, 3SW and 1PB all function as described for the induction motor-generator turbine electric control of FIG. 18. The turbine electrical control of FIG. 19 is designed to be used with a standard commercial electric alternating current standby generator. This standby generator would be a standard unit built to burn natural gas and adapted to burn hydrogen gas. This standby generator would have its own starting system and starting battery and charger. The FIG. 19 turbine electrical control is designed to start one turbine at a time to keep the standby generator size and cost to a minimum. All the turbines in this control system brake the rotor immediately for emergencies and power loss.

All the system disconnects 1CB, 2CB, and contacts for 1PB and similar individual turbine control devices should be set to the "on" position. VS1 and VS2 control the system starting and stopping. Additional VS1 and VS2 contacts have been wired in series to be used to start and stop the standby generator. The standby generator can warm up during the 15 minute 1TR timing cycle. A 1TR timed contact then energizes starters 1M, 2M and starting timer 2TR. Starter 1M connects the first motor-generator 4 to be driven by the standby generator while 2TR times out for roughly 20 seconds adjustable to 180 seconds. When 2TR times out timer auxiliary relay 2TRA is energized. The hydrogen gas vacuum-compressor motor has been running while 2TR was timing. This first motor-generator starting time will normally be enough for the hydrogen gas pump to establish vacuum in the electrolysis cells and pressure in the hydrogen storage tank. The 2TRA bypass of the hydrogen operating vacuum and storage pressure switches 5, 6 and 7SW is now removed. 2TR also energizes the electrolysis starter 3M. Starter 3M connects the electrolysis load 1E through rectifier bridge 1D to the first motor-generator alternating current power output. Starter 3M also de-energizes starter 1M disconnecting this first motor-generator from the standby generator. Note that the first turbine vibration and over speed latch relay 1MA only disconnects 1M and 3M from control power as does 10L. These first turbine faults only brake the first turbine.

Note that in FIG. 19 the turbine motor-generator 4 are started with 120 volts three phase alternating current power. This 120 volt three phase starting voltage is connected to the 240 volt 3 phase turbine motor-generator 4 windings. This low starting voltage greatly reduces the inrush starting current to the turbine motor-generator 4. Reducing the turbine motor-generator 4 starting current greatly enhances the ability of the standby generator to maintain the nominal operating voltage and frequency at all times. This standby generator voltage and frequency regulation assistance also reduces the need to oversize the standby generator and the associated costs. Note that the turbine motor-generators 4 have individual short circuit protection. The first turbine motor-generator circuit breaker 3CB has a trip indication switch 3CBA used to de-energize 1BR and set the rotor brake. Note that the hydrogen vacuum-compressor motor has a short circuit circuit breaker 4CB with auxiliary switch 4CBA. 4CBA causes all the turbines to brake if motor 2M faults. Motor 2M overload relay 20L also stops for a motor 2M overload. Note also that switches 4 through 7SW can cause a system fault braking all the turbine rotors.

A second turbine control logic ladder includes relay and starter coils 11M, 11MA, 13M, 12TR, 12TRA and switches 110L, 11SW, 12SW, 13SW and 11CBA. The second turbine motor-generator short circuit protection is provided by circuit breaker 11CB. This second turbine electric control logic ladder is enabled by a normally open 2TRA contact from the first turbine control logic ladder. This second turbine ladder immediately energizes starter 11M when enabled by 2TR. 12TR times this second turbine motor-generator start for roughly 20 seconds adjustable. 12TR then energizes relay 12TRA. 12TRA then energizes electrolysis starter 13M. 13M connects the second turbine motor-generator 4 to the electrolysis load 1E through rectifier 11D. Starter 13M also de-energizes 11M disconnecting the second turbine motor-generator 4 from the standby generator. 11 and 12SW are the second turbine vibration fault switches. 13SW is the second turbine over speed fault switch. Relay 11MA latches the second turbine vibration and over speed faults and de-energizes brake coil 11BR. 110L and 11CBA also de-energize 11BR. A normally open 12TRA contact is wired to terminals to enable a third turbine logic ladder. Many more turbines can be started one at a time by one standby generator and then connected to electrolysis load 1E. If more than eight turbines are to be used or are planned a programmable logic controller should be used. Several simple standard low priced programmable logic controllers are available such as the ALLEN BRADLEY SLC-100. The cost of a programmable logic controller becomes attractive as the number of timer and non-starter coils to be replaced goes up.

For all turbines of this invention, with the exception of the guy cables, rotor bearings and components embedded in concrete, all structural metal components should be extruded aluminum alloy. Aluminum is the best choice because of it's superior strength over weight ratio and it's much higher oxidation resistance as compared to steel.

In the fabrication and erection of the wind turbines of this invention several assembly modules can be fabricated at the factory for easier field assembly; 1) steel concrete reinforcing frames aligned and welded for guy cable anchor and winch anchor concrete footings, 2) the central support structure anchor to be aligned and welded as a module, 3) the central support structure with erection and hold down gin pole to be aligned and welded as module, 4) the rotor shaft with stiffner, bearing shoulders, end coupling plug and blade support beam hubs to be aligned and welded as a module, 5) rotor blades and sections having the blade support beam hubs aligned and welded as a module, 6) the upper bearing assembly with its guy cable lugs and lighting rod mounting points aligned and welded as a module. These factory fabricated field assembly modules greatly minimize or eliminate the need to weld at the field assembly site.

It is seen that an improved Darrieus-type vertical axis wind turbine is herein illustrated and described which can be fabricated at the factory in modules for shipment to an erection site. The turbine has an improved central support structure with an erection hinge. This erection hinge coupled with erection and hold down gin poles eliminates the need for a final assembly erection crane. A second set of support guy cables for the central support structure aids in reducing the cost of the central support structure and the central support structure anchor. The invention also provides an effective guy cable tension adjustment and vibration dampening apparatus. Although a preferred embodiment of this invention has been selected for illustration and description, it will be apparent that numerous modifications can be made therein without departing from the invention or the scope of the claims attached hereto.

I claim:

1. A vertical axis wind turbine comprising; a rotor shaft in an overlapping stacked assembly, said overlapping stacked assembly including an upper rotor bearing assembly overlapping the upper end of said rotor shaft with a rotor lower bearing and a central support structure overlapping the lower end of said rotor shaft, said central support structure having a hinge connection to a ground embedded central support structure anchor, said central support structure also including an erection gin pole and a hold down gin pole, said upper rotor bearing assembly is attached to four guy cable anchors by four upper bearing assembly guy cables, said central support structure is attached to an additional four guy cable anchors by four central support structure guy cables, said rotor shaft having attached a wind responsive means causing said rotor shaft to rotate in response to wind energy.

2. The vertical axis wind turbine of claim 1 wherein said hold down gin pole further includes a cable guide means.

3. The vertical axis wind turbine of claim 1 further including a substantially square guy cable anchor outline defined by said upper bearing assembly guy cable anchors embedded in the ground to mark the corners of the outline, with said central support structure anchor in the center of the square outline, with two imaginary lines drawn between opposite corners of the square anchor outline, a central support structure hinge connection pin axis making substantially a 45 degree angle with the square anchor outline opposite corner lines when projected onto the ground.

4. A method of assembling and erecting a vertical axis wind turbine comprising the steps of; providing a ground embedded central support structure anchor and eight ground embedded guy cable anchors; assembling a hinge connection between a central support structure and said central support structure anchor with said central support structure in a substantially horizontal position; assembling an overlapping stacked assembly in a substantially horizontal position; said overlapping stacked assembly comprising said central support structure overlapping the lower end of a rotor shaft through a rotor lower bearing, an upper rotor bearing assembly overlapping the upper end of said rotor shaft; providing an erection gin pole and a hold down gin pole attached to said central support structure; attaching one upper bearing guy cable between said upper rotor bearing assembly and a footing attached erection winch, strung in tension over said erection gin pole, to define a temporary erection winch cable, to both hold together and erection pivot said overlapping stacked assembly; assembling and attaching at least two rotor blades to said rotor shaft; attaching an additional upper bearing guy cable between said upper rotor bearing assembly and said central support structure in tension and strung over said hold down gin pole to hold said overlapping stacked assembly together; pulling said temporary erection winch cable to pivot said overlapping stacked assembly about said hinge connection to a vertical position.

* * * * *